May 10, 1927.
R. W. BAILEY
AUTOMOTIVE VEHICLE
Original Filed April 16, 1926   11 Sheets-Sheet 4
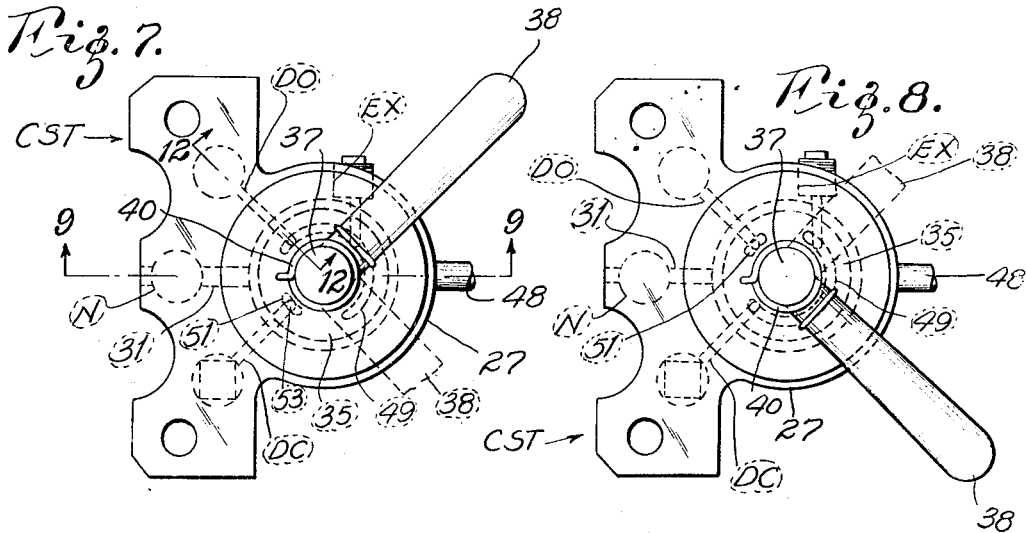
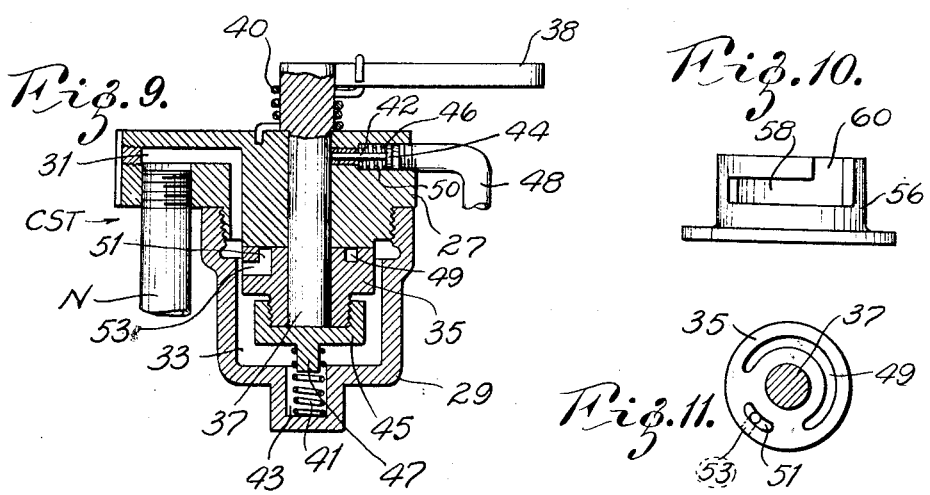
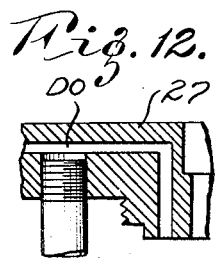
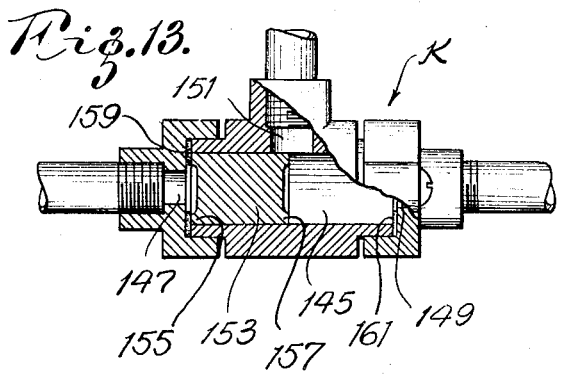

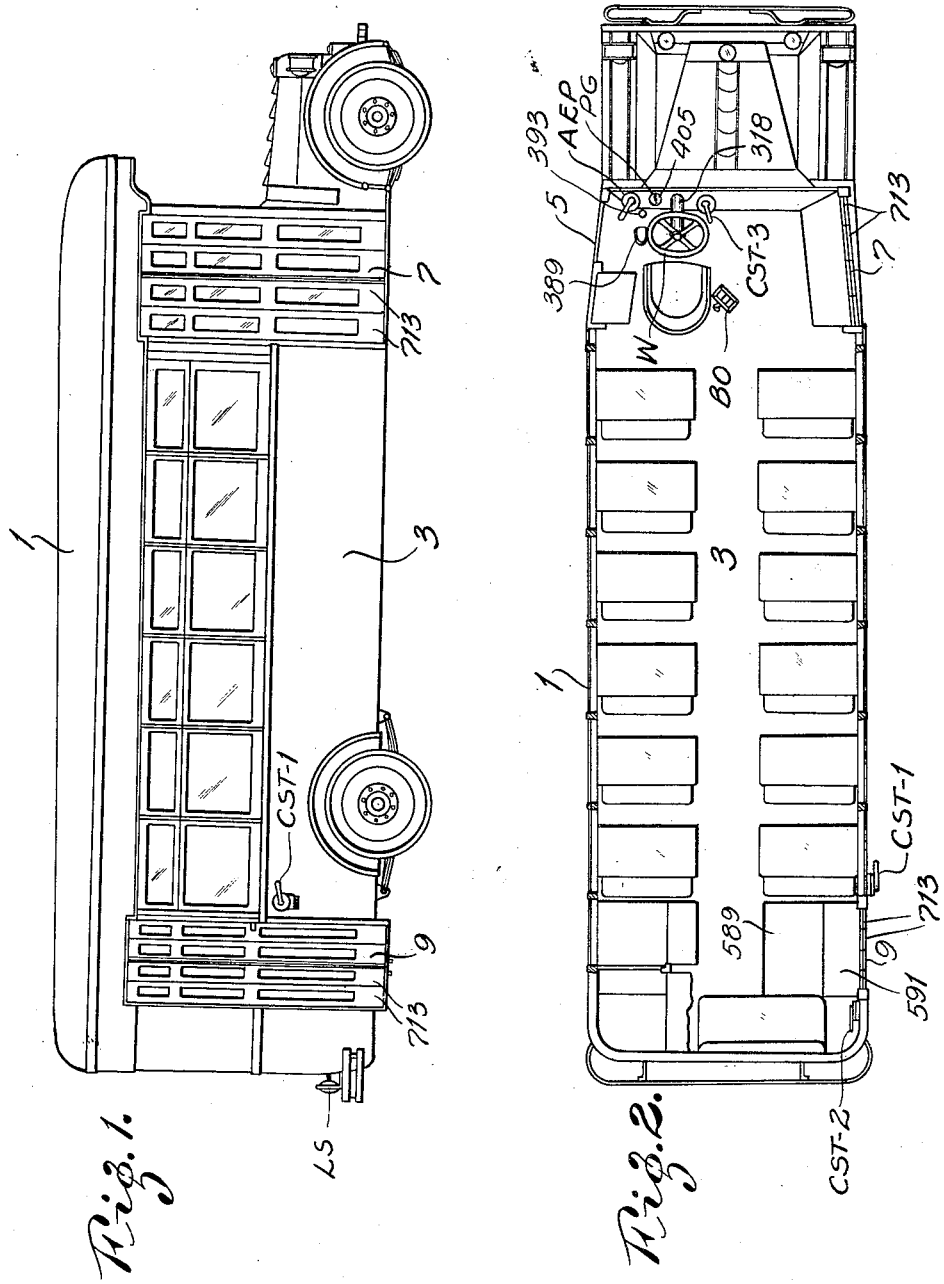

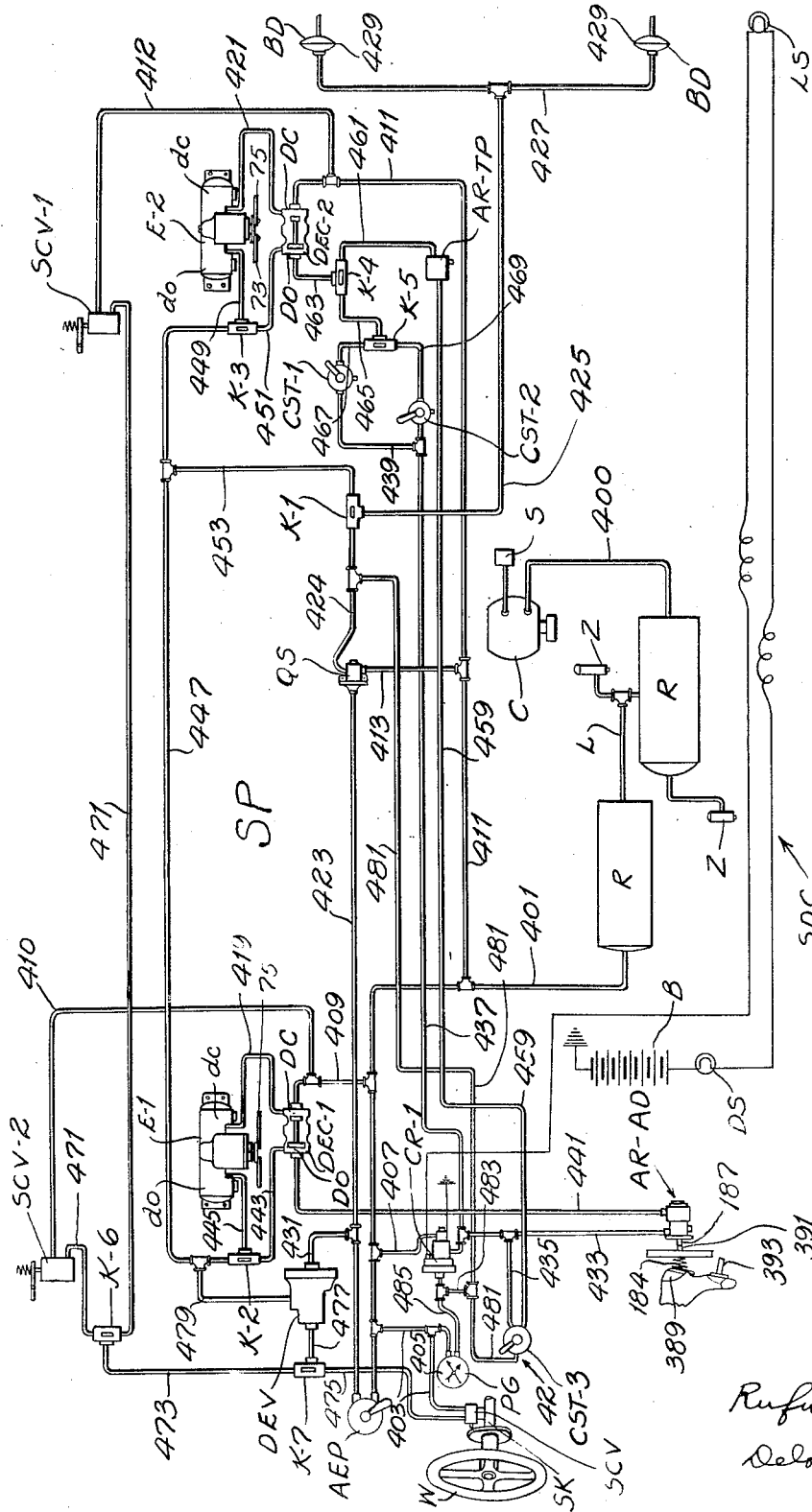

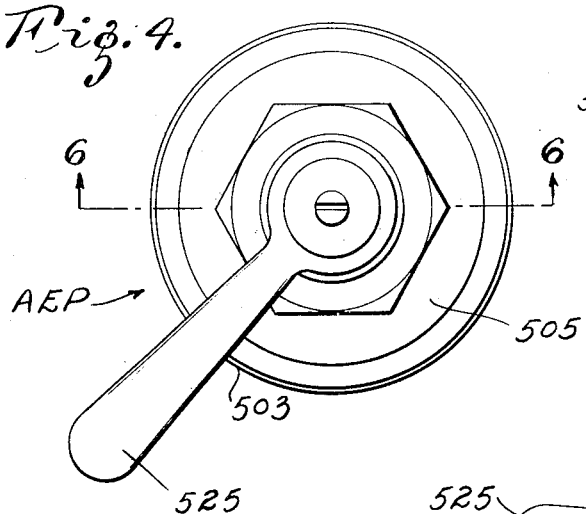
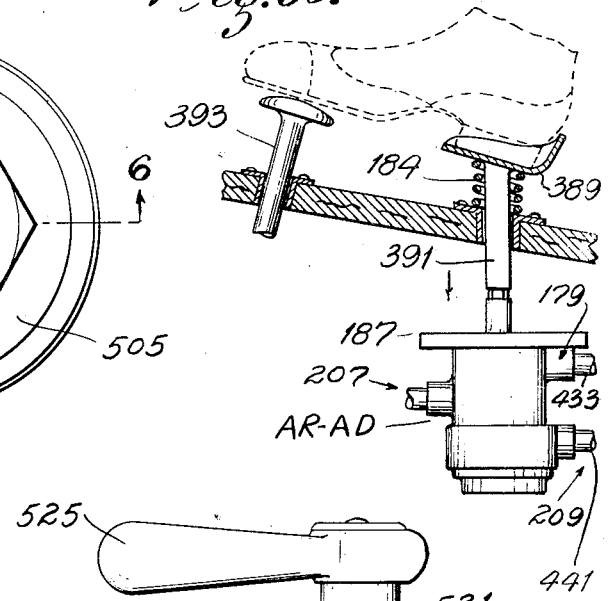
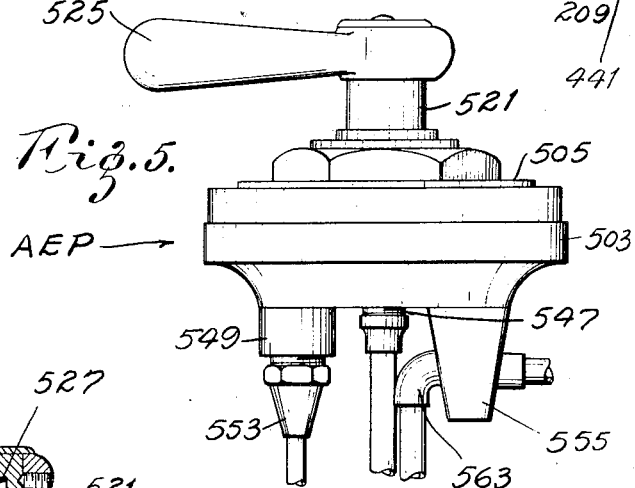
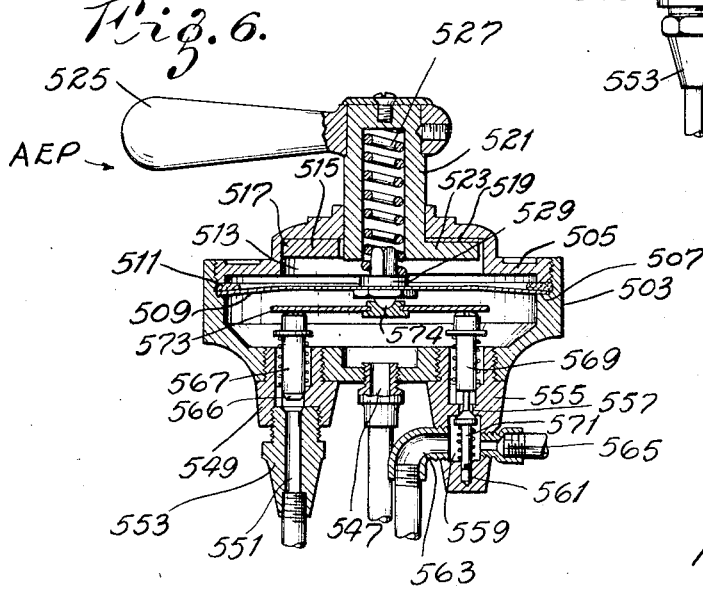

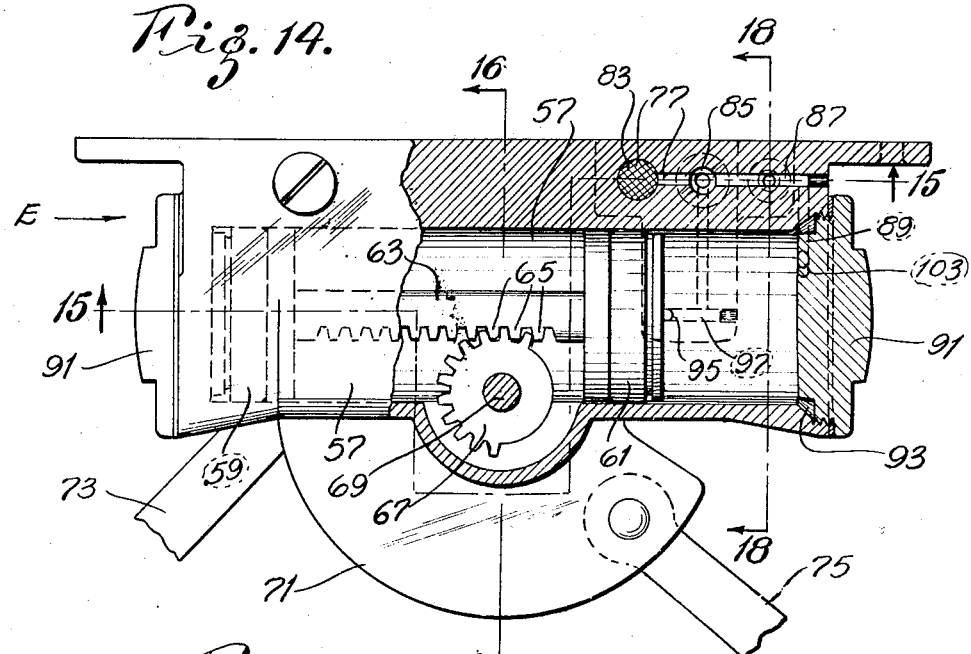

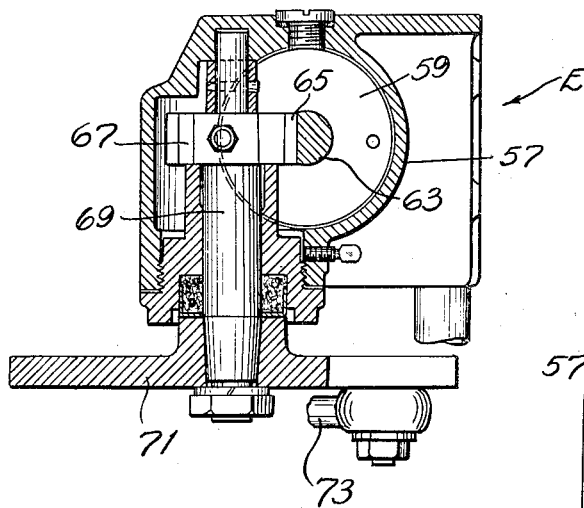
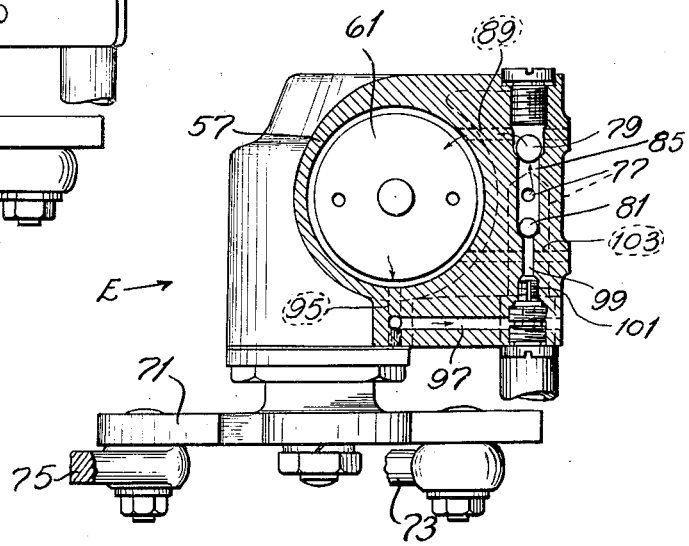
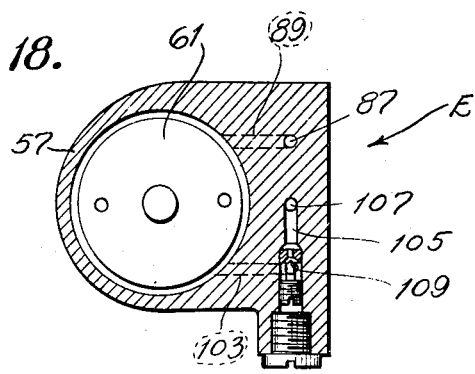

May 10, 1927.  R. W. BAILEY  1,628,350
AUTOMOTIVE VEHICLE
Original Filed April 16, 1926   11 Sheets-Sheet 7
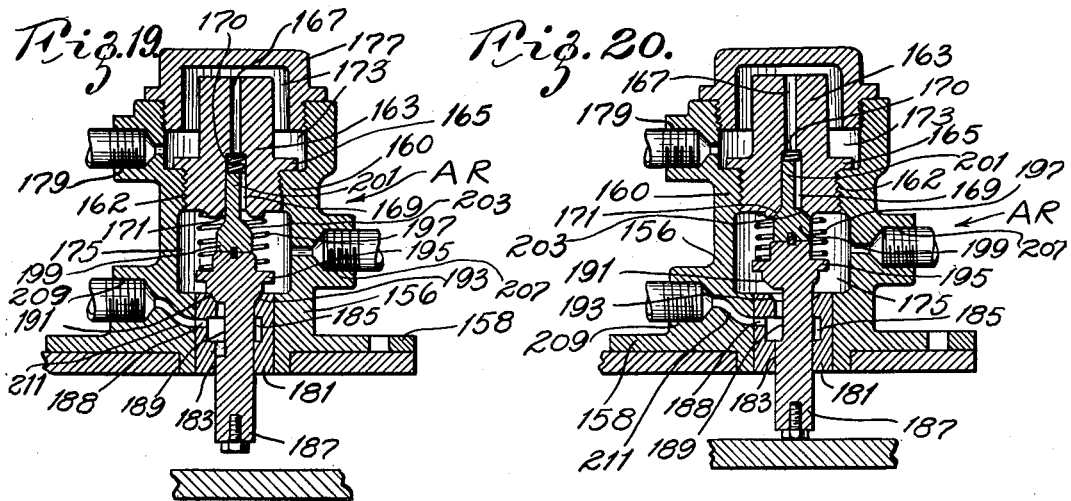
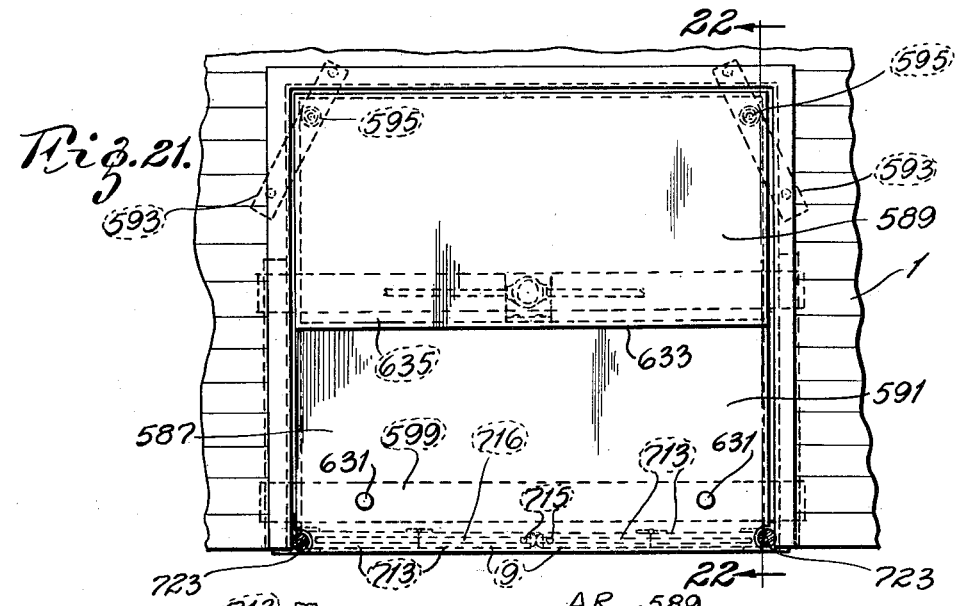
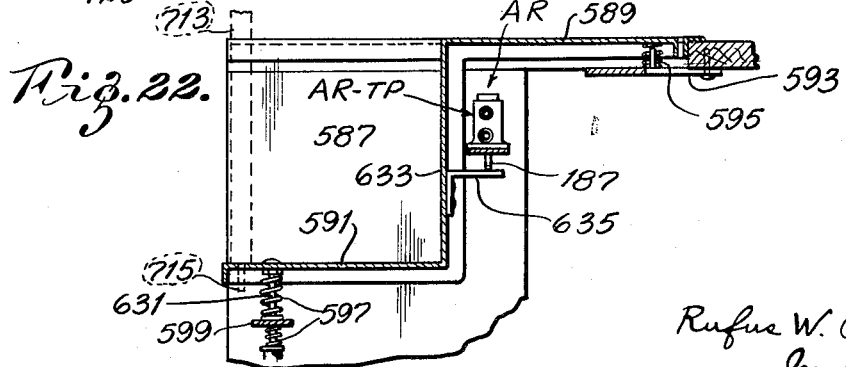
Rufus W. Bailey,
Inventor
Deloz F. Haynes
Attorney

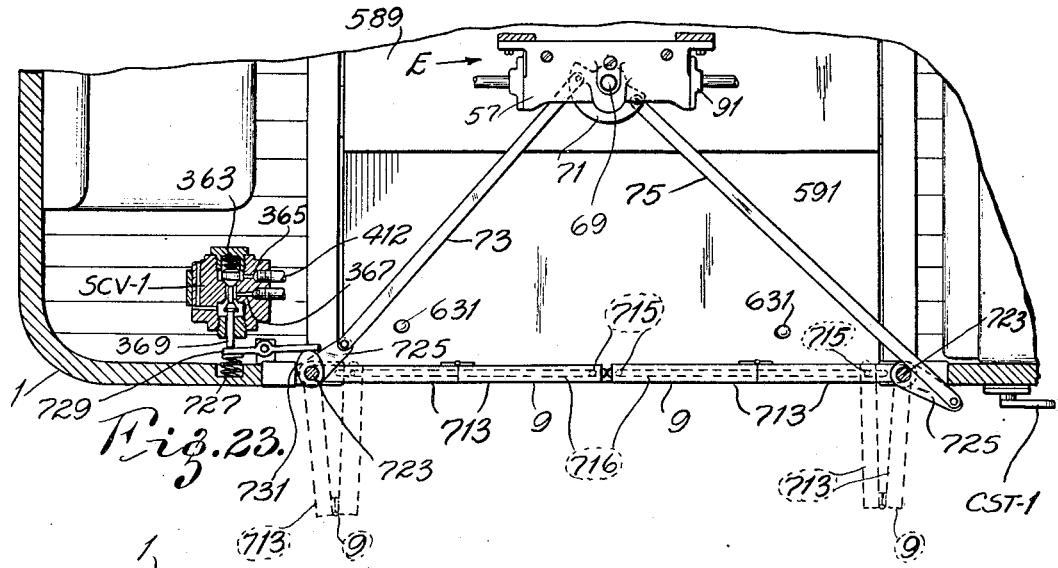
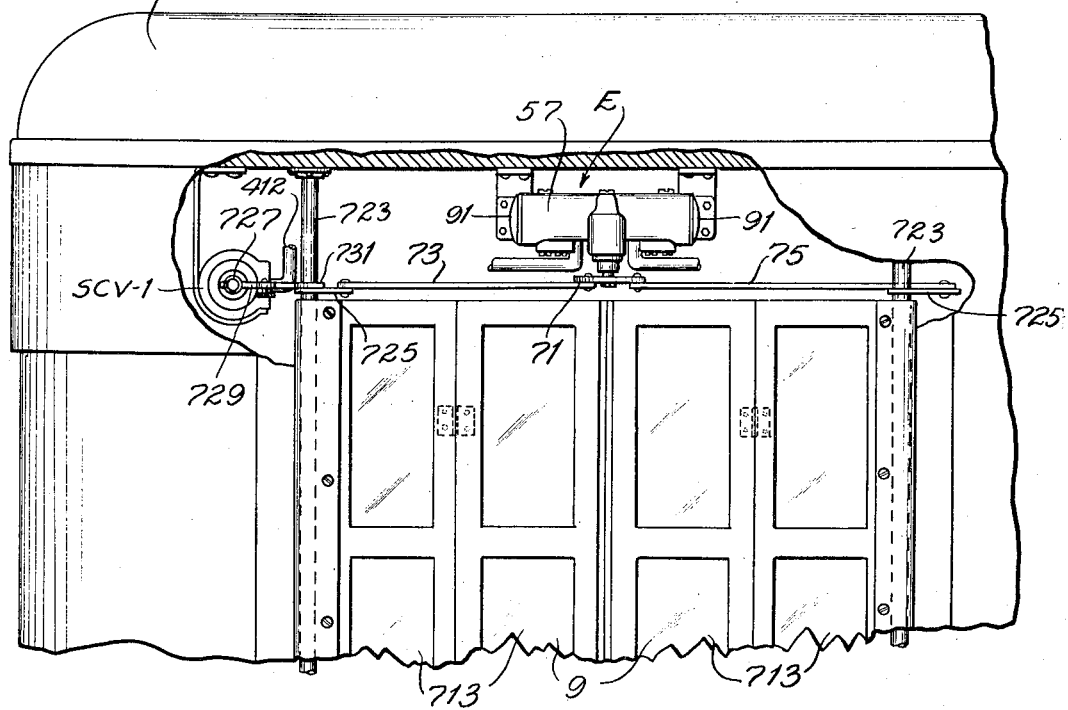

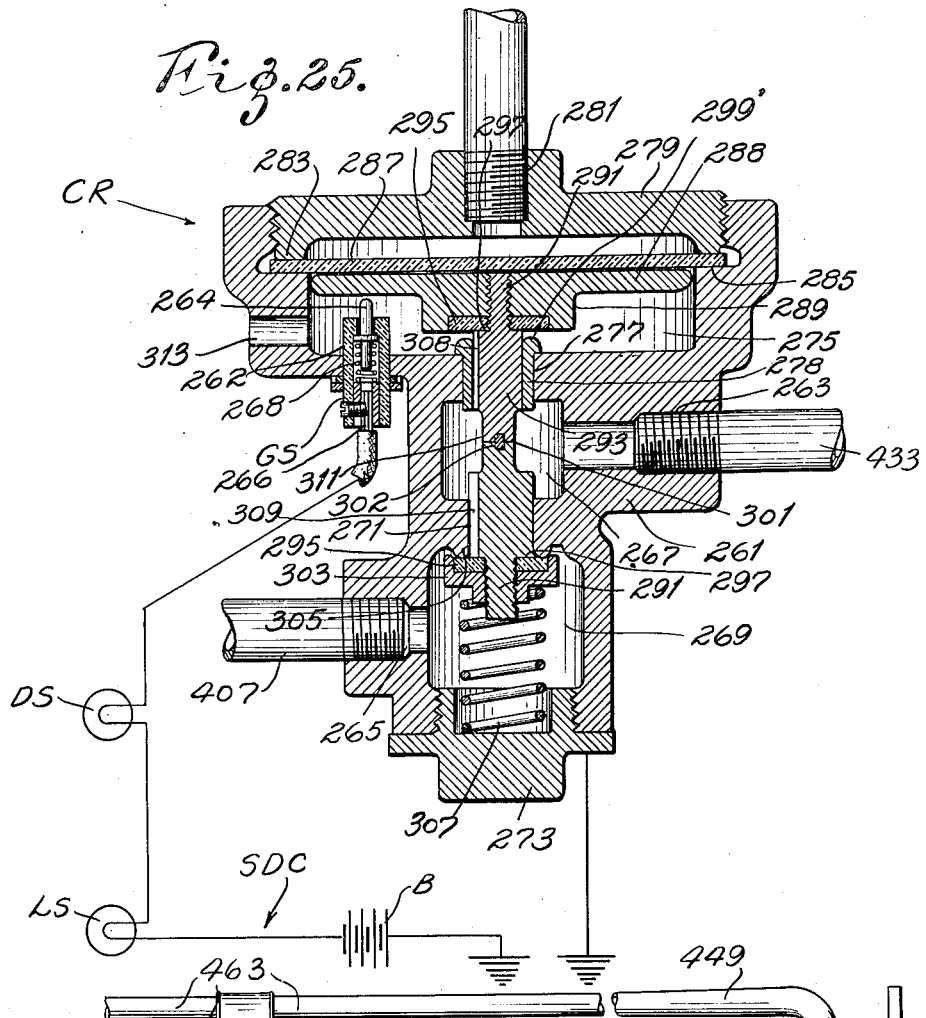
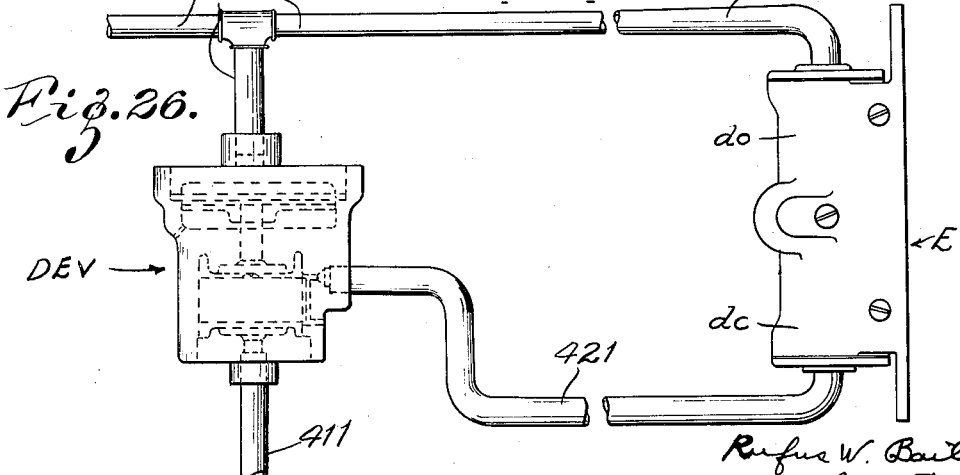

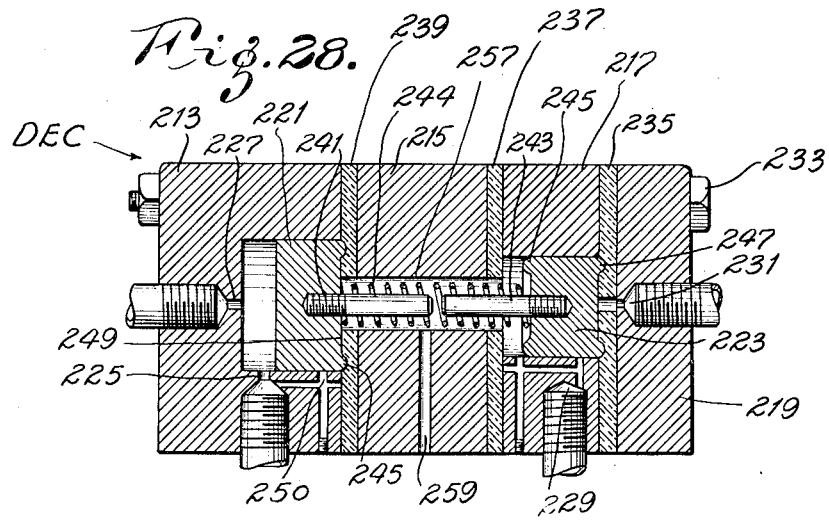
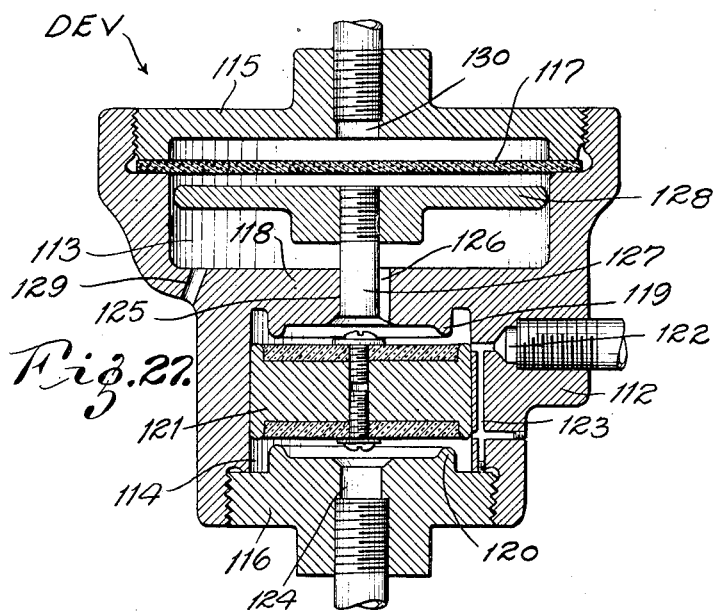

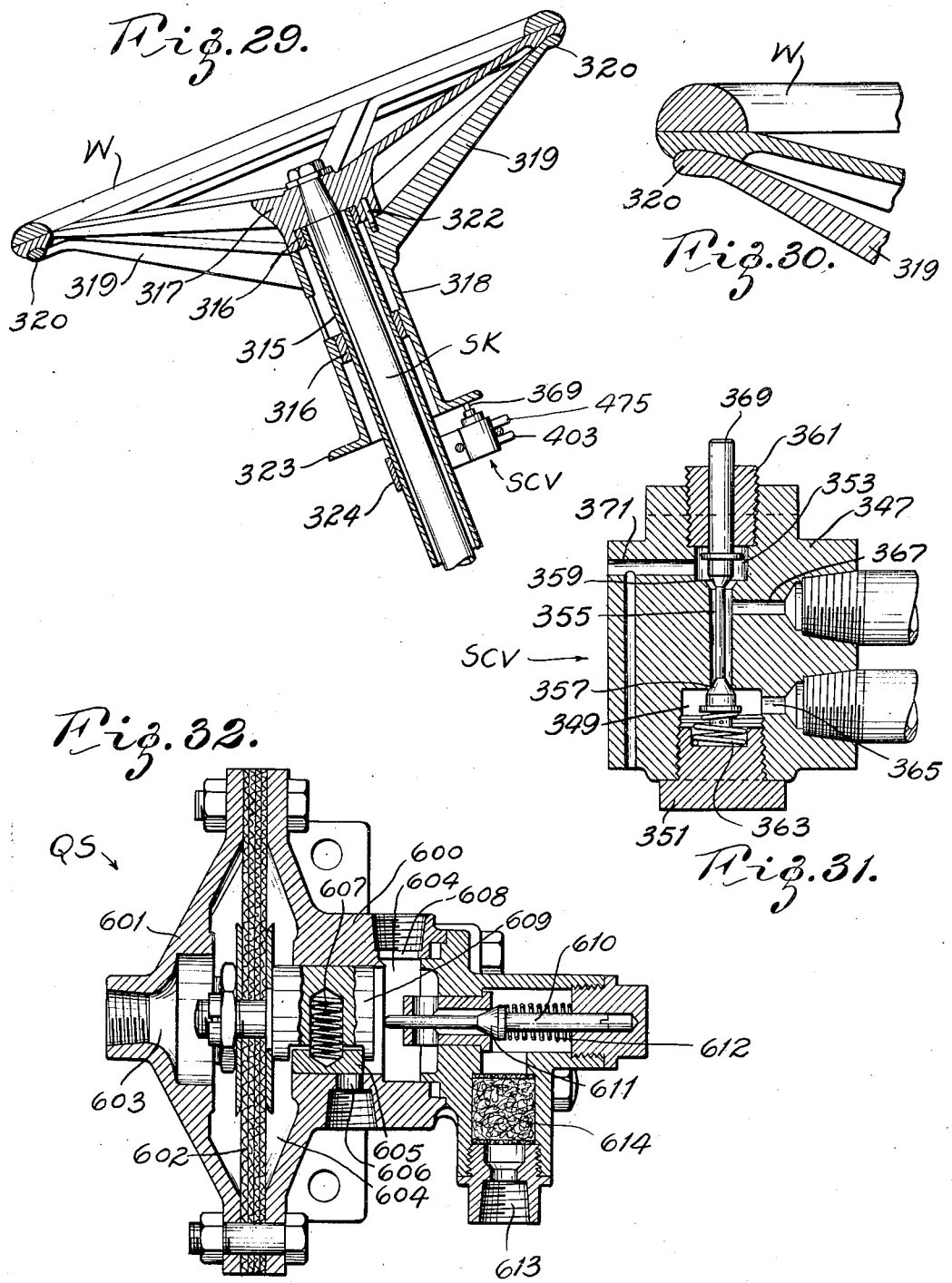

Patented May 10, 1927.

1,628,350

UNITED STATES PATENT OFFICE.

RUFUS W. BAILEY, OF KANSAS CITY, MISSOURI.

AUTOMOTIVE VEHICLE.

Application filed April 16, 1926, Serial No. 102,392. Renewed April 9, 1927.

This invention relates to automotive vehicles and with regard to certain more specific features, to motor coaches or busses.

Among the several objects of the invention may be noted the provision of an improved motor coach equipped with door controls, operable under the care of either one, two or three operators; one which is particularly safe in operation under all exigencies of heavy and fast traffic and which is safe under emergency conditions; and the provision of such a coach as described which shall be economical of the energizing agents which make possible the attainment of the above objects. This invention has a further object the provision of a rugged combination of parts for accomplishing the above ends. that is, a combination subject to little derangement or breakage during normal or even abnormal use thereof. Other objects will be in part obvious and in part pointed out hereinafter.

The invention accordingly comprises the features of construction, combination of elements, and arrangements of parts which are exemplified in the structure hereinafter described, and the scope of the application of which will be indicated in the following claims.

In the accompanying drawings, in which are shown one of various embodiments of the combination herein set forth and several embodiments of certain elements thereof;

Fig. 1 is a side elevation of a motor coach showing parts of the invention applied thereto;

Fig. 2 is a top plan view of the deck of the coach showing parts of the invention;

Fig. 3 is a piping diagram;

Fig. 4 is a plan view of a brake valve;

Fig. 5 is a front elevation of the brake valve of Fig. 4;

Fig. 6 is a vertical section of the brake valve shown in Figs. 4 and 5, taken on the line 6—6 of Fig. 4 and showing parts in full;

Fig. 7 is a plan view of a CST control valve showing one position of the handle thereof;

Fig. 8 is a view similar to Fig. 7 showing the handle of the valve in another position;

Fig. 9 is a vertical section taken on the line 9—9 of Fig. 7;

Fig. 10 is an elevation of a crown piece;

Fig. 11 is a plan view of the rotatable valve proper, of the control valve shown in Fig. 9;

Fig. 12 is a fragmentary section taken on the line 12—12 of Fig. 7;

Fig. 13 is a fragmentary sectional view of a two-way check valve;

Fig. 14 is a plan view of a door engine showing parts broken away;

Fig. 15 is a side elevation of the door engine of Fig. 14 showing portions broken away and is taken on line 15—15 of Fig. 14;

Fig. 16 is a vertical section taken on line 16—16 of Fig. 14;

Fig. 17 is a vertical section taken on line 17—17 of Fig. 15;

Fig. 18 is an ideal section taken on line 18—18 of Fig. 14;

Fig. 19 is a vertical section of a release valve shown in open position;

Fig. 20 is a vertical section similar to Fig. 19 showing the valve in closed position;

Fig. 21 is a plan view of the rear door treadle mechanism;

Fig. 22 is a vertical section taken on line 22—22 of Fig. 21;

Fig. 23 is a plan view with parts broken away showing the rear door linkage;

Fig. 24 is a fragmentary side elevation with parts broken away of the parts shown in Fig. 23;

Fig. 25 is a vertical section of a relay valve shown in closed position and diagrammatically shows a signal circuit therewith;

Fig. 26 shows the application of differential emergency valve to operating a door engine such as is shown in Figs. 14 to 18;

Fig. 27 is a vertical section of the differential emergency valve shown in Fig. 26;

Fig. 28 is a horizontal section of a door engine control valve;

Fig. 29 is a section of a steering gear showing the application of an emergency safety control valve thereto;

Fig. 30 is an enlarged detail section taken at the rim of the steering wheel;

Fig. 31 is a vertical section of an emergency safety control valve;

Fig. 32 is a section of a quick service brake valve; and

Fig. 33 is a detail section showing a safety door control for a foot accelerator.

Similar reference characters indicate corresponding parts throughout the several views of the drawings.

Deck arrangement.

Referring now more particularly to Figs. 1 and 2, there is illustrated at 1 a motor coach comprising an enclosed deck 3. This deck 3 is provided forwardly thereof with a set of doors 7 to be used as an entrance to the coach. These doors 7 are located on the right hand side of the coach looking forwardly thereof. On the left hand side of the coach opposite said doors 7 is provided a door 5. The door 5 is provided for the entrance and exit of the driver only, and in this invention, comprises no automatic features. Rearwardly on the right-hand side of said deck 3 is provided a set of doors 9 to be used as a passenger exit only, under normal conditions, but may be used as a passenger entrance, under such abnormal conditions as will be described hereinafter.

Under normal operating conditions all passengers enter the lower deck at the front doors 7, and in choosing a seat, pass rearwardly. Upon leaving, they pass rearwardly to the rear doors thus obviating the necessity for any forward traffic in the aisle, that is, this is a one-way aisle.

The doors 7 and 9 and the braking system of the coach are under control of an interlocking compressed air system SP, illustrated in Fig. 3.

Control features.

The system SP may, without adjustment be put under the control of either one, two or three men, i. e. the driver, the driver and conductor, or the driver, conductor and street fare collector. The position of leaving passengers influences operation also, as will be described hereinafter.

The system SP involves several valve and door-engine detail features which will be explained and described before the use and operation of the system as a whole is described.

Valves.

For the use of each the conductor and street fare collector a releasing air valve is used. Its primary nomenclature in this specification will be CST. This nomenclature will be subscripted for various applications of the valve.

Each valve and piece of apparatus which may have various applications in this invention will have a primary designation, and subscripted designations, the latter to be used for the various specific applications of the part in question.

Other valves and apparatus to be used herein are:

Door operating engines E, double check valves K, automatic release valves AR, door-engine control valves DEC, a control valve CR a differential emergency valve DEV, a safety control valve SCV, a pneumatic brake valve AEP, and a quick service valve QS.

The descriptions of the various recited members will now be taken up. Other coach mechanisms will also be described.

Valve CST.

For the use of each the driver, conductor and street fare collector, a valve CST is used. This valve will be described in all parts as herein used and the particular modifications made thereon for specific applications will later be explained (see Figs. 7 to 12).

The valve CST as illustrated in Figs. 7, 8 and 9 comprises a body 27 with a lower chambered cup 29 screwed upwardly thereto. Pipe N brings air to the body portion 27 and 29. A bore 31 leads from the pipe N to a chamber 33 in cup 29. The chamber 33 contains a valve 35. This valve 35 has fitted thereto the stem 37. The valve 35 is kept seated against the body 27 by the coiled spring 41 which reacts at its lower end in a pocket 43 of the cup 29 and at its upper end against a cap 45 screwed to the valve 35. The cap 45 has cast centrally therewith a lug 47 for aligning the spring 41.

The valve 35 has an arcuate groove 49 cut in its upper face which serves alternately to join ports DC and DO of the body 27 with an exhaust port EX. Likewise a groove 51 communicating with the passage 53 serves to connect the pipe N through bore 31 alternately with said ports DC and DO.

In Figs. 7 to 9, the stem 37 is illustrated as having a permanent handle or lever 38 fitted thereto. This lever is adapted to be normally held in its Fig. 7 position, that is, door closing position by the coil spring 40. A pin 42 slidably held in the body 27, and having a piston head 44 which fits in a bore 46 of said body is adapted to be pressed against the stem 37 by means of air pressure brought to the bore 46 from an air line 48. When air presses on the piston head 44 at a proper pressure, then the pressure exerted by the pin 42 on the pin 37 is enough to prevent movement of the said pin 37 under action of the spring 40. The lever 38 may be manually moved however, regardless of the air pressure on the piston 44. The return spring 50 under the piston head 44 serves to normally disengage the pin 42 from the pin 37, thereby permitting the spring 40 to move the lever 38. The reason for this cooperative action between the pin 42, and pin 37, whereby a braking action is obtained, will be made clear later.

Under certain conditions of operation for a conductor or street fare collector the handle 38 has substituted therefor a removable handle fitted to an upward squared portion of the pin 37 (not shown). A crown piece 56 is then fastened to the top of the body 27, which, due to a lateral slot 58 permits operative oscillations of the removable lever, but because of the vertical slot 60, equal in width to the width of the lever, will not permit of taking off the lever except at one position, namely the solid-line Fig. 7 position.

Now it is evident that in the case of a removable lever being used for the lever 38, because of the crown-piece 56, that said removable lever or handle can be applied to the valve stem 37 only when the groove 49 connects the port DO with the port EX and consequently when the pipe N is in communication with the port DC, that is, when the valve is in a door-closing position. It can be removed only under like conditions.

For use as a conductor's valve CST—2 and as a street fare collector's valve CST—1 the described valve CST (using a removable handle without the automatic brake 42) has only its door closing port DC plugged shut.

For use as an operator's rear control valve CST—3, this valve has both the said port DC and its exhaust port plugged shut (see Figs. 7 and 8) and employs the spring returned handle as well as the automatic brake 42.

Door engines E.

The door-operating engines E (Figs. 14 to 18) each comprise a cylinder 57 within which is mounted a pair of pistons 59 and 61. The pistons are held together as a unit by means of a rack bar 63. The bar 63 has rack teeth 65 cut therein to engage with a pinion 67 mounted vertically and at right angles to the center line of the cylinder 57. The pinion 67 is adapted to be turned through an angle of practically 180 degrees by movement of said rack 63. The said rack is moved under influence of the pistons 59 and 61 as the pistons move when air is turned into and out of the ends of the cylinder 57. The pinion 67 is made fast to a vertically borne shaft 69 which passes outwardly of the device and carries a wrist plate 71 preferably at the lower end thereof. The purpose of wrist plate is to pivotally carry connecting rods 73 and 75 for operating the doors (see also Figs. 23 and 24).

In order to oscillate the wrist plate 71 and at the same time adjustably cushion the operation of the doors kinematically connected thereto, the following valves and ports are used on each end of each of the air engines E (Figs. 14 to 18).

A combined inlet and exhaust pipe is led into a port 77 at each side of the cylinder 57. This port 77 leads to check valves 79 and 81 by way of a cross port 85. The port 77 has a conventional air strainer 83 set therein. Leading from the outlet side of the check valve 79 is a port 87 which has a branch port 89 leading into the end of the cylinder 57. Heads 91 are provided on said cylinder. These heads do not block the ports or passages 89 because of bevel recesses 93 cut into the cylinder 57.

A passage 95 leads from the cylinder 57 at a point near the end of the piston work stroke, to a cross passage 97. The passage 97 leads to said check valve 81 by way of a vertical passage 99. The passage 99 is provided with a renewable bored exhaust-rate-varying plug 101.

From the end of said cylinder leads another line 103 (below the said inlet passage 89) which joins a passage 105 leading to a third passage 107. The passage 107 leads to said cross passage 85 between the check valves 79 and 81. An adjustable throttling plug 109 is placed in the passage 105 (Fig. 15) for purposes of adjusting the rate of exhaust and consequently the rate of closing the doors. Passages such as described are formed at both ends of the cylinder 57.

The operation of the door engine E in order to reach its position shown in Figs. 14 to 18, is as follows:

By means of a valve to be described, air is permitted to enter the passage 77. It passes to the passage 85, seats the valve 81, but opens the valve 79, goes through passages 87 and 89 to the cylinder 57, whereby the piston 61 is forced back as shown. Hence the doors are repositioned.

In order to reverse the movement of the doors air is admitted to the other end of the cylinder, and the said inlet valve, to be described for the right-hand end, turned to an exhausting position. By this means the pistons tend to be forced to the right. The charge of pressured air in the right end of the cylinder has its pressure decreased as soon as said valve is set to exhausting position because air may leave by way of the passages 95, 97, plug 101, passage 99, valve 81, passages 85, and 77 to the said exhaust by way of proper pipes to be described. This constitutes a quick release for the trapped air.

Next, as the piston 61 moves to the right, the passage 95 is covered. Some of the air had escaped by the passages about to be enumerated but now all remaining air must leave by such passages. These are passages 103, 105 (including the adjustable throttling plug 109), passages 107, 85, and 77 to said exhaust. Hence the doors are closed. Of course at the opening of the doors some air entered by way of the last-named passages but not primarily so.

The purpose of the primary exhausting by way of the passage 95 is to quickly relieve relatively high pressure. Thereafter the throttled exhaust through the port 103 and the ports connected therewith causes a cushioning action in the movement of the doors whereby they are prevented from slamming. The adjustable throttling plug 109 provides means for readily changing the amount of cushioning of the doors.

The means for admitting air at the right and exhausting at the left, or admitting air at the left and exhausting at the right of the cylinder will be described in detail later, and a coordination thereof with the said engines will be made clear.

Double check valves K.

The check valves K (Fig. 13) each comprise a cylinder 145 with a pipe connection at either end and one centrally thereof. Passages 147, 149 and 151 lead from these pipe connections to said cylinder. The latter passage 151 leads to the center of the cylinder 145 as shown. A free piston 153 is provided within the cylinder 145. The piston 145 is provided with lips 155 and 157 which seat on gaskets 159 and 161 respectively. The piston 153 if of such length that the central port 151 is open whenever the piston 153 is seated at either end of the cylinder. Thus, air entering the cylinder through either of the passages 147 or 149 forces the piston 153 to the opposite end of the cylinder, where one of its lips cooperates with a gasket, thus sealing that end of the cylinder 145, while the incoming air passes out through the open central port.

Automatic release valve AR.

The automatic release valve AR forms a component part of valve mechanisms AR—TP and AR—AD, the application of which mechanisms will be described later. The valve AR (Figs. 19 and 20) comprises a body portion 156 flanged at 158 for fastening the body to other parts of the vehicle. The body portion 156 is inwardly flanged at 160 and said flange is inwardly and vertically threaded at 162. The inward threads 162 are adapted to receive a differentially bored plug 163. The plug 163 is provided with a shoulder 165 for seating purposes on the inward flange 159. The plug 163 is provided with the said vertical differential bore 167 which has an enlarged lower portion 169. The lower enlarged portion of bore 169 is provided with a downwardly facing beveled seat 171. The plug 163 is adapted to divide the body 156 into two inward compartments. One of these compartments 173 is above the other compartment 175. The upper compartment 173 is closed by means of a threaded cap 177. The said compartment 173 is provided with a threaded inlet port 179. Below the compartment 175 and in the body 156 is forced a bored bushing 181. The bore 183 of this bushing 181 has a counterbore at 185 therein, and a lateral bore 188 meeting said counterbore. The bushing 181 has slidably fitted into its bore 183 a stem 187. The stem 187 has a flat milled portion 189 cut therein. It is also provided with a downwardly beveled shoulder 191 adapted to cooperate with a beveled upper portion 193 of said bore 183. When the beveled portion 191 of the stem 187 is seated on the beveled portion of the bushing 181 the milled portion is adapted not to come to the lower edge of the bushing. Above the beveled shoulder 191 is provided another flat shoulder 195 adapted to take the reaction of a spring 197 placed thereon. This spring 197, beside reacting on the said shoulder 195, reacts at its upper end against the plug 163. Pressed to the upper surface of the stem 187 within the confines of the spring 197 is a teat 199. An aligning key prevents too much lateral play between the members 187 and 199 but does permit of unavoidable disalignment between the bores 169 and 183. A spring 170 is provided in the bore 169 for holding the teat 199 against the stem 187. The teat 199 is provided with a reduced portion 201 which extends slidably into the said enlarged lower hole 169 of the plug 163. The reduced portion 201 is milled flat on one side. At the base of the reduced portion of the teat 199 is provided another beveled shoulder 203 adapted to cooperate with the said lower beveled seat 171 of the plug 163.

It will be seen that this construction results in a second and lower chamber 175 within the body 156. This chamber 175 is provided with a threaded outlet 207. Oppositely formed on the body 156 is a threaded exhaust port 209. The port 209 has a cored connection 211 with the said laterally located bore 188.

The vertical distance between the upper beveled shoulder 203 and the lower beveled shoulder 191 is less than the distance between the beveled seat 171 of the plug 163 and the beveled seat 193 of the bushing 181. Hence in the position shown, the spring 197 is adapted to seat the shoulder 191 on the seat 193, thereby keeping the exhaust port 209 out of communication with the chamber 175. If the stem 187 is pushed upwardly against the reaction of the spring 197 until the beveled shoulder 203 strikes the beveled seat 171, said exhaust port 209 is put into communication with the said chamber 175 and outlet port 207 where said inlet port has been in communication with the chamber and outlet port.

The operation of the valve AR is as follows:

If it is desired to pass air from the inlet port 179 to the outlet port 207 the stem 187 is left free. This permits the spring 197 to close the downward valve seats thus keeping the exhaust port 209 out of communication with the inner chamber 175 of the valve. Air then passes into the port 179, chamber 173 through the passages 167, 169 into the lower chamber 175 and to the outlet 207. The milled portion of the extension 201 permits passage of air through the bore 169 since said portion is formed to the shoulder 203. To shut the valve it is only necessary to press the stem 187 into the body 156 until the upper valve seat is closed. This opens the lower seat. All passage of air from the inlet port 179 to the outlet port 207 is thus stopped. However the opening of the lower seat permits any air in chambers connected with the outlet 207 to pass back from said outlet into the chamber 175 through the lower valve seat, through the bore 183, counter bore 185, lateral bore 188, cored passage 211 and out to the exhaust 209. The milled portion 189 is formed up to the said beveled shoulder 191 and therefore air may pass as described.

*Door engine control valves DEC.*

These valves (Fig. 28) comprise four annular body portions 213, 215, 217 and 219. The end body portion 213 forms a cylinder into which is fitted a relatively large diametered piston 221. The body portion 217 forms a cylinder into which is fitted the relatively small piston 223. The more or less centrally located body portion 215 forms a cylinder of relatively smaller bore than either of the said cylinders or body portions 213 and 217. Laterally formed in the body portion 213 is an outlet port 225. Longitudinally and centrally of said body portion 213 is formed the inlet port 227. A corresponding outlet port 229 and a corresponding inlet port 231 are formed in the body portion 217 and the body portion 219 respectively. The four body portions 213, 215, 217 and 219 are bolted together by means of studs 233. The body portions have interposed between them gaskets 235, 237 and 239. These gaskets are formed of leather or other suitable material. Previous to the assembly of the body portions above described the said pistons have been fitted therein. Shanks 241 and 243 are centrally screwed into the pistons 221 and 223 respectively. A spring 244 wound around the said shanks 241 and 243 serves to hold the pistons apart and in the positions shown in Fig. 28.

Each piston is provided upon its inward face with an annular lip 245 and the small piston 223 is provided with an annular lip 247 on its outer face. These lips are adapted to cooperate with said gaskets to form a tight sealed joint. The large piston is provided with an inner face 249 adapted to come within the range of a branch port 250 of the outlet port 225 when the piston 221 is at the head of its cylinder 213. The piston 223, when the piston 221 is at the head end of its cylinder is adapted to have its outer edge cross the outlet port 229.

Now when the piston 221 is at the tail end of its cylinder as illustrated in Fig. 28, then its left surface is adapted to clear the outlet port 225. When the small piston 223 is in its right hand position shown in Fig. 28, that is, at the tail end of this cylinder, then its inner surface is adapted to clear a branch port 256 of the said outlet port 229. In other words, the interior portions of the cylinders 213 and 217 are adapted to communicate with the outlets 225 and 229 when their respective pistons 221 and 223 are at either ends of their cylinders.

The inner cylindrical portion 257 of the body portion 215 is in communication with the inner cylindrical cavities of the body portions 213 and 217. The gaskets are adapted to permit this. The inner cylindrical portion 257 is also provided with an exhaust port 259. The function of the valve is as follows:

Relatively high pressured air coming into the inlet port 231 puts the pistons in the positions opposite to the position shown in Fig. 28 and passes to the outlet port 229 for use as required, namely to operate the door closing side of the door engines E (Fig. 3). This puts the former outlet 225 of the body portion 213 into communication with the exhaust port 259. The outlet 225 receives air from the door opening side *d o* of a door engine. Hence this air is exhausted.

Since the large piston 221 has a greater area than the small piston 223, air pressure entering the inlet port 227 equal in pressure to that entering inlet port 231 would cause the pistons to be thrown over to the positions shown in Fig. 28. Hence any air that has theretofore passed from the inlet port 231 to the outlet port 229 would now escape to the exhaust port 259 as hereinbefore indicated. This would mean, in the present application of the valve, that air would escape from the door closing side *d c* of a door engine.

The spring 244 serves as a lost-motion engagement between the pistons so that two lips such as 245 and 247 may seat simultaneously on their respective gaskets even though said gaskets have unequal original thickness or shrink unevenly while in use. The operation is such that the small piston may be seated first and then the larger area of the large piston causes said large piston to be pushed forward, compressing the spring to such an extent that its lip imbeds itself in the gasket 239.

Meanwhile the air entering the inlet port 227 would pass to the outlet port 225, and in the present application, would pass to the door opening side $d\ o$ of the said door engine.

Upon releasing or substantially decreasing the pressure on the large piston, the pressure on the small piston again causes the first described conditions and residue air from the door opening side $d\ o$ of the said engine passes to the exhaust port 259.

The valve is adapted to permit a given reservoir pressure to normally pass to the door closing end $d\ c$ of a door engine and to hold said engine in door closed position. This it does by passing through the small piston side of valve DEC. However, should this same pressured air be led by other paths to be described, to the large piston side of the valve DEC, the valve will act to permit that air to pass to the door opening side $d\ o$ of the door engine and cause the air in the said door closing side $d\ c$ of said engine to exhaust.

With regard to Fig. 3 it should be noted that the door engine E—1 and E—2 have had their respective ends arbitrarily designated with the letters $d\ o$ and $d\ c$ for indicating the door-opening and door-closing ends respectively. It is evident that the respective ends of the cylinders of the engines may be made to perform reverse operations if the engines are mounted properly with respect to the door-opening linkages.

The valve DEC acts as a selective shunt for a given pressured air, its selectivity being with reference to the point from which said air comes.

Control valve CR.

This valve (see Fig. 25) is adapted to permit passage of high pressure air therethrough when certain lines reach another predetermined lower air pressure.

Referring now to Fig. 25, the valve CR comprises a body 261 provided with threaded ports 263 and 265. These ports 263 and 265 communicate with chambers 267 and 269 within the valve body 261. The chamber 269 is below said chamber 267 and connects therewith by a longitudinal bore 271. This chamber 269 is closed and made air tight by a threaded cap 273.

The said chambers are substantially circular. Above the chamber 267 is located another relatively large circular chamber 275 connected with said central chamber 267 by means of a concentric bore 277. The bores 277 and 271 are coaxial. The bore 277 is provided with a bushing 278.

The upper chamber is closed by a flat threaded cap 279. The cap 279 is provided with a threaded inlet port 281. Said cap retains between a flange 283 thereof and an inner shoulder 285 of said body 261, a flat, tough and pliable disc 287.

Located below this disc and in proximity thereto is a metallic plate 288. This plate is adapted to act as a backing plate to the disc when air pressure is led into the port 281. Said plate is provided with a downwardly extending cylindrical portion 289 centrally bored to receive a threaded shank 291 of a two-piece guide bar 293. The cylinder 289 is counterbored at the bottom thereof to receive a flat upper gasket 295 made of leather or other pliable material through which said shank 291 extends. A shoulder 297 on the guide bar 293 holds the gasket 295 in place. A circular lip 299 formed on the liner 278 is adapted to cooperate with said upper gasket 295.

The guide bar 293 comprises two similar pieces of cylindrical metal joined at the point 301 by ordinary means such as by the shelf-aligning joint 302 as shown in the drawing.

The pieces are alike but the lower one is inverted and has its threaded shank 291 screwed into a counterbored abutment 303. The shoulder 297 of the piece holds another lower gasket 295 in place within said counterbore; and a lower lip 305 of the body 261 cooperates with said lower gasket 295.

A coil spring 307 reacts under normal conditions, between the lower cap 273 and the abutment piece 303 to hold the lower gasket 295 to a seat on the lip 305, thus putting the lower chamber 269 and the control chamber 267 out of communication with one another.

The two pieces of the guide bar 293 are slotted along their lengths through the passages or bores 277 and 271 in all positions of the bar therein. The slots 308 and 309 abut the said gasket at one end of their respective lengths and at the other end pass into a cut-back portion 311 at the juncture 301 between the pieces. The slots are adapted to permit passage of air through the bores 271 and 277.

The upper chamber 275 is provided with an exhaust port 313 below said disc 287.

The operation and adaption of the valve is as follows:

Air which is being used for braking purposes is led to the port 281, above the disc 287. This air comes in varying pressures as will be explained again later. Sometimes it is zero when the brakes are not set. It is a maximum (say ninety pounds per square inch) part of the time during which the brakes are being set. At other periods during the braking operation it may be only at fifteen pounds per square inch for effective brake operation.

Now this valve, when used with the pressures quoted, namely fifteen and ninety pounds, has the effective projected areas of the disc 287 and the lower surface of the abutment 303 proportioned in the ratio of 6 to 1, that is, the area of the disc is six times that of the abutment. Hence these areas are in the inverse ratio of the critical pressures noted, namely fifteen pounds and ninety pounds.

Now if high pressure (ninety pounds per square inch) reservoir air passes into the lower port 265, it presses the pressure on the abutment. Hence the air can not pass out of the chamber 269. This becomes a fact under the assumption that there is less than fifteen pounds pressure above the disc 287. The then relative positions of the valve parts are as shown in Fig. 25.

Then, if air above fifteen pounds pressure be led into the inlet port 281 above the disc 287, that disc will be depressed and force the upper gasket 295 to a seat on the upper lip 299. This will also result in the lower gasket 295 being pushed from its lower lip 305, and the high pressure (ninety pounds per square inch) air at the port 265 may then pass into the chamber 269, out through the slot 309, through chamber 267 and to the port 263.

At any time that the predetermined pressure (such as fifteen pounds per square inch) is not maintained above the disc 287, the high-pressure air will again close itself off as described, that is, by raising the guide bar and seating the lower gasket 295. When this occurs the high-pressure air in the passages connected with the port 263 may go back through the passage 267, up through the slot 307 and into the chamber 275 and out of the exhaust port 313.

This valve CR may act as an emergency relay where the air which may be led above the disc 287 is at the same pressure as the relayed or valved air.

This valve CR has a stoplight and a dash board signal light circuit SDC operatively connected therewith.

This circuit SDC is grounded through the metallic parts of the valve CR, has a lighting battery B connected in circuit therewith, as well as lamps LS and DS, and a grounding switch GS. The switch GS is mounted on the body of the valve CR and comprises a simple insulating body portion 262 which slidably holds a spring pressed pin 264 made of electrically conductive material. This pin 264 is adapted to be depressed by the said plate 288 when the plate 288 descends. At this contingency the pin 264 cooperates with a terminal 266 in the grounded circuit SDC, thereby closing the circuit and lighting the lamp LS and DS. When the plate 288 again rises the pin 264 automatically breaks the circuit under action of its return spring 268. By this means a signal is displayed to other drivers on the highway and to the coach driver whenever the pressure entering the line 281 is of magnitude great enough to cause setting of the brakes, that is, above fifteen pounds per square inch or more. The lamps LS and DS are connected in series so that if the stoplight should accidentally burn out, then the driver will be aware of the fact, in so far as he will note that his dash signal is not operating.

*Differential emergency valve DEV.*

This valve (Fig. 27) has among other applications thereof, substitution for the said differential emergency control valve DEC of Fig. 28, and use as a differential emergency valve for use as indicated in the circuit illustrated in Fig. 3 under the nomenclature DEV.

This valve DEV comprises a body portion 112 having therein an upper chamber 113 and a lower chamber 114 closed by heads 115 and 116 respectively. The head 115 holds a diaphragm 117 to the body 112 which is similar to the diaphragm 287 of the said valve CR. A wall 118 separates the chambers 113 and 114. This wall has a downwardly extending lip 119 formed therewith and the said cover piece 116 has a similar upwardly extending lip 120 formed therewith. A loose piston 121 floats in the chamber 114. Said piston 121 has leather faces at each end which are adapted to cooperate with said lips 119 and 120, depending upon which end of the chamber 114 the piston is located.

A port 122 having a branch passage 123 communicates with the portion of the chamber 114 which is above the piston 121 but is cut off from such communication when the piston is upwardly seated on the lip 119. When the piston is seated as described on the lip 119, then the port 122 communicates with the lower end of the chamber 114 (below the piston 121), that is by way of its branch port 123.

A second port 124 communicates with the chamber 114 below the piston 121. The chamber 114 communicates with the said chamber 113 by way of a passage 125 which has a groove 126 cut therein. The passage 125 slidably receives a stem 127 to which is fastened a backing plate 128 adapted to take the pressure of the diaphragm 117. The effective area of the diaphragm 117 is again greater than the effective areas of the piston 121. An exhaust passage 129 leads from the chamber 113 to the atmosphere.

The operation of the valve is simple. When only a relatively low pressure is had above the diaphragm 117, that is entering the port 130, then relatively high pressured air entering the port 124 is adapted to push the piston 121 upwardly thereby causing it to cooperate with the stem 127 and to push the plate 128 upwardly. The high pressured air may then pass from the port 124, through the chamber 114, the branch passage 123, and to the port 122. When the pressure entering the port 130 increases to a point above a predetermined relatively low amount, then the effect of the pressure from the port 124 is overcome, and the plate 128, stem 127, and piston 121 are depressed until the piston 121 cooperates with the lip 120. The port 124 is thus cut out of communication with the port 122 and air may exhaust from the port 122 back through the chamber 114, milled passage 126, chamber 113 and out through the exhaust 129.

Fig. 26 illustrates one application of the valve DEV in which it is substituted for a differential emergency control valve DEC. Its detailed operation in this regard will later be made clear, but it is here evident that when substituted for the said valve DEC that absolutely all possibility of leakage operation between the high pressure and low pressure circuits is prevented because the air tight diaphragm is interposed between these circuits. The operation of the valve as a straight differential emergency valve will later be made clear when the diagram of Fig. 3 is explained.

*Safety control valve SCV.*

Figs. 29 to 31 show the construction of this valve and the attendant parts.

The ordinary steering rod SK of the vehicle is provided with the wheel rim W operable on said rod.

Below the hub of said wheel W is a shell or tube 315 for protecting the steering column, to which is fastened a pair of bushings 316, the upper one of which is adapted to guide the hub 317 of the wheel W and the lower one of which is adapted to guide a tube 318.

Extending in a somewhat radial fashion from the said outer tube 318 of the upper end thereof are a plurality of spider arms 319 adapted to support an auxiliary rim 320. The rim 320 is juxtapositioned beneath the rim of the wheel W and is partially positioned within a circular groove cut in beneath the rim of the said wheel W. The sectional contour of the rim of the wheel W and the rim 320, when juxtapositioned is practically round, that is, of a form to easily fit the hand when steering. When the driver's hand is in position for steering the wheel W, that is gripping it, then the rim 320 is held against the wheel W and consequently the tube 318 is held in an elevated position. Slidable dowel pins 322 screwed into the upper end of the tube 318 serve as guides.

The lower end of the tube 318 is provided with a laterally extending flange 323 which is adapted to cooperate with the pin or stem 369 of the safety control valve SCV. The valve SCV is mounted on a bracket 324 which bracket is fastened to said tube 315.

The valve SCV is itself illustrated more particularly in Fig. 31.

It comprises a body 347 with an inner chamber 349 therein closed by a cap 351. A second chamber 353 is formed in said body 347 coaxially with the said chamber 349. Bore 355 connects the said chambers 349 and 353. The stem 369 extends through the chamber 353, bore 355 and into the chamber 349. It is beveled at points 357 and 359 for the purposes of seating at the lower and upper ends of the bore 355 at alternate times. The upper part of the stem 369 extends from the body 347 and is held in slidable alignment by means of a bushing 361. A spring 363 tends to hold the beveled portion 357 to a seat, that is, under normal conditions of operation. If the upper end of the stem 369 is depressed, then the beveled portion 357 is lifted from its seat and the beveled portion 359 is brought to its respective seat.

Now at a point below the seat 357 in the chamber 349 is formed a port 365. Between the seats 357 and 359 and communicating with the bore 355 is a second port 367. Above the seat 359 and communicating with the chamber 353 is a third exhaust port 371.

Operation is as follows:

Compressed air from the port 365 tends to normally hold the beveled portion 357 to an upward seat, that is, with the aid of the spring 363. By this means flow of air from the port 365 through this valve SCV is prevented. At the same time air may exhaust from the port 367 through the bore 355, port 359, chamber 353 and to exhaust 371. If pressure is brought to bear on the stem 369, such as by the application of the weight of the tube 318 and attendant parts when not held upwardly by an operating hand around the rim 320, then the beveled seat 359 is closed and the seat 357 opened. By this means communication of the port 367 with the exhaust 371 is blocked and communication is had from the port 365 to the port 367 by way of chamber 349, seat 357 and bore 355.

It is evident that during the ordinary steering manipulations, that an operator is preforce required to grip the rims W and 320, thereby holding the flange 323 out of operable contact with the stem 369. Hence no air can flow from the port 365 to the port 367, but the port 367 is in communication with the exhaust 371. Should the operator lose control of the coach through loosing his grasp on the wheel (such as when death or the like overtakes him) then the flange 323 automatically drops on the stem 369 thereby putting the port 365 in communication with the port 367, and taking the latter port out of communication with the exhaust. The exact application of this operation to the pneumatic circuits herein used will later be clarified.

Brake valve AEP.

This device is shown in Figs. 4, 5 and 6, and comprises means for applying the brakes which are set from conventional pneumatic braking elements BD (see Fig. 3).

Referring to the figures noted, it will be seen that the valve comprises a body 503 on which is screwed a cap 505 adapted to hold down against a shoulder 507 on said body a flexible diaphragm 509. Between the diaphragm and the cap is interposed a sealing gasket 511.

Into an upwardly formed concentric recess 513 of the cap 505 is forced an annular cam 515. The cam has one high portion 517 and one low portion 519 and is of an inverted type.

Rotatably fitted into a central bore of the cap 505 and passing downwardly through the annular cam 515 is a hollow operating post 521 provided with a laterally extending follower 523.

The follower is adapted to follow on the operating surface of the cam. An operating handle 525 is fitted tightly to the post.

The hollow portion of the post is provided with a coil spring 527 which abuts the top of the hollow portion and reacts on an abutment piece 529 bolted centrally on said diaphragm 509.

Movement of the handle 525, such that the follower rides on the high side of the cam 515, causes the diaphragm to be depressed.

The body 503 has an outlet port 547 screwed into the bottom thereof.

A bored bushing 549 is also screwed into said body from below. The bore is differentially arranged with the smallest diameter below and a slot in the wall of said small diametered bore. The said small bore is met by a beveled smaller bore 551 of a nipple 553 screwed to said bushing. The nipple receives an exhaust pipe.

A second bored bushing 555 is screwed into said body opposite the said bushing. It is provided with a slotted differential bore similar to the one above described. This bore is met by a small bore 557 from below of diameter less than the smaller diameter of the differential bore. The bore 557 is beveled on its lower edge and opens into a larger bore 559. A guide hole 561 leads down from the bore 559.

An inlet passage 563 is provided for the bore 559, as well as a gage passage 565 which leads to a pressure gage. The gage may or may not be connected to this line. In Fig. 3 an improved connection for the gage is illustrated and will be explained later. If in any case if the gage is not connected to the line 565, said line should be plugged shut.

Two pins 567 and 569 are fitted to the smaller bores of the bushing 549 and 555, respectively. Springs, set into the larger portion of the differential bore, tend to press the pins upwardly by means of shoulders on said pins. The pin 567 is adapted by means of a bevel 566 to seat on the upper beveled portion of the exhaust bore 551 when pressed down. The pin 569 does not seat when pressed down.

Screwed into the pin 569 is a shouldered and upwardly beveled pin 571, adapted to have its bevel seat on a lower bevel of the hole 557 when the pin is forced upwardly by said spring above, and a spring acting therebelow.

A flexible cross-member 573 is adapted to transmit the motion of said diaphragm 509 to the said pins. The cross-member 573 is adapted to rock on a bearing 574.

Operation of the valve is as follows:

In the position of the handle shown in the figures, which is non-braking position, the inlet port is shut off from the outlet port 547 by the small pin 571, and air from the outlet port 547 may pass to the exhaust port 551. In this position of the handle the brakes are released as far as the brake valve is concerned.

Now if the ear 523 is made to ride on the high side 517 of the cam, then the diaphragm 509 is forced down as well as the cross bar 573. Hence, by means of the said pins 567 and 569 the exhaust port is closed while the inlet port is open, thereby permitting air to pass to the outlet port and to the brake diaphragms. The amount that the spring 527 is compressed determines the pressure which will be applied at the brakes, because when braking pressure builds up beneath the diaphragm 509 to a value determined by said spring 527, then the valve 567 lifts slightly due to the rising action of the diaphragm 509. The braking pressure is therefore kept at a given value as determined by the position of the handle 525, which positioning determines the amount of pressure that the spring 527 is capable of exerting.

Accelerator mechanism.

Fig. 33 illustrates the means by which an AR valve is adapted to become the AR—AD valve. A valve AR is inverted so that its stem 187 extends upwardly. Slidably arranged in some portion of the frame of the vehicle, just above the AR—AD valve and normally held upwardly by means of a spring 184 is a heel plate 389 attached to a pressure pin 391. The pin 391 is adapted to engage the stem 187 whenever the heel of the operator's foot is positioned in the heel plate 389. This is because of the weight of the operator's foot. When his foot is positioned in the heel plate as shown in Fig. 33, he may pivot it on and in the heel plate, whereby an accelerator pedal 393 may be operated. The accelerator pedal 393 is positioned with regard to the heel plate 389 such that the operator's toe may engage the accelerator pedal when his heel is positioned in said heel plate. It is evident that the accelerator pedal cannot be operated unless the heel is so positioned and hence only when the valve AR is in a position whereby the ports 207 and 209 are in communication. This, as will be seen later, means that the front doors of the coach will be shut. It is therefore evident that in order to start the car from the accelerator pedal 393, that the doors will be in a closed position because the pedal 393 is not readily reached without positioning the heel in the plate 389.

Quick service valve QS.

This valve is illustrated in section in Fig. 32 and comprises a body portion 600 to which is bolted a head 601 with a flexible diaphragm 602 therebetween. The head 601 has a port 603 which is adapted to be connected to the outlet side of the brake valve AEP as will later be shown. The chamber 604 behind the diaphragm 602 contains an exhaust valve 605 which is slidably arranged in said chamber 604 and is fastened to the diaphragm 602. The valve 605 is adapted to open and close an exhaust port 606 and is spring-pressed to a slidable seat by means of a spring 607. An inlet port 608 connects with the brake chambers and the said chamber 604.

The diaphragm 602 is normally in such a position that the exhaust port 606 is just slightly open, thereby keeping the brake chambers and other chambers connected therewith open to the atmosphere (see ports 606 and 608).

Placed behind the portion 609 which carries the valve 605 is a second valve stem 610 which in the normal position in the diaphragm 602 is adapted to have its seat 611 closed under action of a spring 612. By this means air is normally prevented from passing from a reservoir port 613 to the chamber 604. However, when a sufficient air pressure is permitted to enter the port 603, then the diaphragm 602 is distended to the right thereby positively closing the exhaust port 606 and engaging the portion 609 with the valve stem 610. This means that the seat 611 is opened, whereby reservoir air may pass to the port 608 connected with the brake chambers and other chambers to be described. A conventional strainer 614 is placed just inside the reservoir port 613.

It is evident that variable pressure may be permitted in the inlet port 603 by the brake valve AEP. The valve 611 is adapted to close when the brake chamber pressure (in the port 608) builds up equal to that created in the brake pipe attached to the port 603. When this brake pipe pressure is exhausted by action of the brake valve AEP, then the diaphragm is deflected to the left the full amount. Hence, the exhaust port opens and air is released from the brake chamber and other chambers associated therewith. It is evident from the above, that the variable breaking pressures which is maintained at the port 603 by means of the valve AEP is also maintained on the other side of the diaphragm, that is, in the brake chambers connected with the port 608. This valve in substance acts as a relay.

Door operating linkages.

The linkages extending from the door engines E to the doors 7 and 9 are practically the same for the said front and rear doors 7 and 9.

The operation of the AR—TP valve in conjunction with the rear door treadle holds only for said rear door. The front door is not equipped therewith.

The linkage that is common to the two doors is described as follows (see Figs. 23 and 24).

The doors 7 and 9 comprise pairs of hinge leaves 713, the outer ones of which carry downwardly extending pins 715 adapted to follow in grooves 716 at the bottom of the doors. The inner leaves 713 are made fast to vertical shafts 723. By turning the shafts 723 through an angle of substantially ninety degree (counter-clockwise) the doors may be brought from the solid line position shown in Figs. 23 and 24 to the dotted line position shown in Fig. 23. This is done by means of connecting rods 73 and 75 joining crank arms 725 associated with said shaft 723, and the wrist plate 71 of said door engine E. It is evident from the figures, oscillations from the wrist plate 71 will cause opening and closing of the doors 713 in the cushioned manner hereinbefore described.

The door operating linkage so far described is operable for both front and rear exits 7 and 9.

For the purpose of making operable certain safety features, hereinafter to be made clear, safety control valves SCV are associated with the door operating linkages (see Figs. 23 and 24). The stem 369 of each of these valves is normally depressed under action of a spring 727 operable to throw a rocker arm 729 against said stem 369, that is when the doors are open. By this means the ports 365 and 367 of the valve SCV are put into communication.

When the doors are closed a cam 731 fastened to one of the pairs of shafts 723 throws the said rocker arm 729 in a position whereby the pressure effect of the spring 727 is cancelled. The stems 369 are therefore thrown back under operation of the springs 363 within the valve SCV—1. This action puts the port 367 in communication with the exhaust and cuts it off from the port 365. The valve is then closed against passage of air.

The subscripted nomenclature of the valve SCV, as applied to the rear door 9 is SCV—1, as above used. Its nomenclature for the front doors 7 is SCV—2.

Treadle control.

The rear door has a special passenger door control arrangement. This comprises a depression 587 at the rear door. The floor of this depression comprises two steps 589 and 591 integrally formed (see Figs. 21 and 22). These steps float within the depression 587. The floating feature is had by bolting members 593 across the corner of the depression and holding up the rear edge of the steps by means of springs 595 reacting against said pieces 593. The lower step 591 is held in a floating fashion by means of springs 597 reacting upwardly and downwardly against a member 599 formed beneath the opening 587 and wound around a bolt 631 formed with the step 591. On the riser 633 between the steps 589 and 591 is bolted an angle iron 635 adapted normally to engage the stem 187 of an AR—TP valve mounted on another cross member 637. When the steps are depressed against the action of their upholding springs 595 and 597, by the weight of a leaving passenger, then the angle iron 635 leaves the stem 187 of the valve AR—TP. The function of this arrangement will be clarified but it should be here noted that a pair of steps are provided which are entirely free from rattle and noise while providing the desired automatic features. Hardened bolts are screwed into the ends of the stems 187 to prevent undue wear.

Pneumatic system SP (Fig. 3).

Referring now in particular to Fig. 3 the operation of the pneumatic system will be made clear.

An air compressor C supplies a reservoir R with air at, say ninety pounds per square inch pressure by means of a pipe line 400. The reservoir may comprise one or more tanks adapted to be mounted upon the vehicle. The compressor and reservoir are equipped with proper auxiliaries such as an air strainer S for the compressor and for the reservoir, relief cocks and a safety valve Z. If more than one tank is employed such as is shown in said Fig. 3, a connecting line L is provided for each added tank.

Leading from the reservoir R to the inlet of the driver's brake valve AEP is a direct air pipe line 401. This line 401 has four branch lines under reservoir pressure. Branch 403 supplies a sight gage 405, by means of which the driver reads the pressure conditions in the reservoir and attendant lines. This line 403 also supplies the port 365 of the driver's safety control valve (shown also in Figs. 29 and 31). Branch 407 supplies the inlet 265 of the door control relay valve CR—1 with air at reservoir pressure. Branch 409 supplies the door engine-control valve DEC—1 with air at reservoir pressure at the said valve's door-closing or small-piston end DC. Branch 411 supplies the differential engine-control valve DEC—2 with air at reservoir pressure at the said valve's door-closing or small-piston end DC. The pistons are diagrammatically shown in the pipe diagrams.

The branch line 411 has a sub-branch 413 thereon adapted to lead air at reservoir pressure to the quick service valve QS. The differential valves DEC—1 and DEC—2 under normal running conditions (no brakes being used) have their small pistons forced from over their respective ports by means of pressure in the lines 409 and 411, thereby permitting air at reservoir pressure to reach the door-closing sides $d$ $c$ of the door engines $E^1$ and $E^2$, that is, by means of short lines 419 and 421. This causes the doors to be held shut.

Leading from the lines 409 and 411 are lines 410 and 412 which pass to the ports 365 of valves SCV—2 and SCV—1 respectively.

The pipe lines of the system SP so far enumerated will hereinafter be described cumulatively as the main reservoir pressure lines operating at, say ninety pounds to the square inch, continually with the exception of the short lines 419 and 421, which carry said pressure most of the time, that is, when the doors are closed.

The relatively short length of pipe that continually carries the reservoir pressure is subject to less leakage than the complete system would be, were all of said system or most of it continuously under this relatively high reservoir pressure. This is one source of economy in the present invention.

The lines next to be described receive air from the said main reservoir lines by way of the brake valve AEP. The valve is shown in brake-release position in Fig. 3.

From the brake valve AEP is provided a line 423 which leads to the said quick service valve QS at the inlet port 603 thereof. From the brake chamber 604 of said valve QS leads a line 424 which passes to a check valve K—1. From the check valve K—1, a line 425 leads to a cross line 427 which leads air to the two brake operating diaphragms 429. These diaphragms operate the brakes on the wheel drums simultaneously.

Leading from the said line 423 is a branch line 431 which leads to the upper side of the diaphragm of the valve DEV.

It is evident that the brake valve AEP, upon being turned far enough counterclockwise (Fig. 3) from its brake release position shown in Figs. 3 and 6, will close its exhaust and thereafter cause air from the said main reservoir lines to enter the line 423 from whence it causes the quick service valve QS to pass air from the line 413 to the line 424, through the check valve K—1, lines 425, 427, to the brake diaphragm 429. It also permits air to reach the top of the differential emergency valve DEV by way of line 431.

A vehicle which is being brought to a standstill by means of a frictional brake should have the pressure on the braking surfaces somewhat relieved just as a standstill is about to be reached, that is, in order to avoid jolting the vehicle and passengers therein. Hence the air pressure in the said lines 423, 431, 425 and 427 is manipulated by means of said valve AEP to bring about the required results mentioned for the braking surfaces. The variable braking effect is brought about by means of the diaphragms 429 which act under the variable pressure. Therefore the lines 423, 425, 427 and 431 are subjected to pressures varying from ninety pounds per square inch gage to about fifteen pounds per square inch gage while braking, and to zero pressure gage while not braking. These lines will hereinafter be called variable pressure lines. It will be noted that the quick service valve QS acts as a relay and that it could be dispensed with as well as the line 413 by connecting the line 423 directly into the check valve K—1. The valve QS however, gives a quicker and more complete action at the brakes.

The outlet side of the direct control relay valve CR—1 is provided with a line 433 which passes to the AR—AD valve. The line 433 has two branches. One branch 435 leads to the driver's automatic valve CST—3. The other branch 437 leads to a cross line 439 which interconnects two valves CST—1 and CST—2, said valves being of the CST type. These valves have no brakes 42 but have removable handles. The valve CST—1 is operated by the street fare taker and the valve CST—2 by the conductor. The door-closing ports DC of these valves are plugged, as described hereinbefore.

The lines 433, 435, 437 and 439 are filled with air at reservoir pressure, only when the said variable pressure lines are at a pressure of fifteen pounds or more. These lines will hereinafter be called relayed high-pressure lines. These lines feed the remainder of the circuit with high pressure air through various manually operated valves, the connections for which will now be described. The remainder of the air lines in the system will be known as high pressure operating lines.

The outlet of the accelerator door valve AR—AD is connected to the door opening side DO of the differential engine control valve DEC—1 by means of a line 441. The same end DO of said valve DEC—1 is connected to the door opening side $d\ o$ of the said door engine $E^1$. This connection is made by way of a line 443, a check valve $K^2$ and a short line 445 from the outlet of said check valve.

The check valve $K^2$ is connected with a check valve $K^3$ by means of a line 447. Said check valve $K^3$ is connected to the door opening side $d\ o$ of door engine $E^2$ by a short line 449 from the outlet of the valve. The other inlet side of the check valve $K^3$ is connected to the door opening end DO of the differential valve DEC—2, by means of a line 451.

A branch line 453 from said line 447 connects the line 447 with the said check valve K—1.

The operator's rear control valve CST—3 has its outlet side connected to the pilot treadle valve AR—TP by a line 459. The valve CST—3 comprises the described CST valve with DC port and exhaust plugged.

The pilot treadle valve AR—TP has its outlet side connected with a check valve K—4 by means of a line 461. The outlet of said check valve K—4 leads by way of line 463 to the door opening side DO of the differential valve DEC—2. This same check valve K—4 has its other inlet side connected with the outlet of a check valve K—5 by means of a line 465. The inlets of said check valve K—5 each connect with the outlets of said valves CST—1 and CST—2 by means of lines 467 and 469 respectively.

The outlets of the valves SCV—1 and SCV—2 are interconnected by means of a line 471 having a check valve K—6 therein. The outlet side of the valve K—6 connects with one end of a check valve K—7 by means of a line 473. The other side of the check valve K—7 has a lead 475 running to the safety control valve on the steering column. The outlet side of the check valve K—7 connects with the inlet port 124 of the valve DEV by means of a line 477. The outlet port 122 of said valve DEV connects with the line 447 by means of a line 479. A line 481 connected into said lines 424 leads air to said brake 42 of the driver's CST—3 valve whereby the handle of the valve is held in a predetermined set position by said brake, whenever the brakes of the vehicle are set. Said positioning of the handle of the CST—3 valve can of course be changed at any time by the application of manual pressure thereto, that is, from the hand of an operator as hereinbefore described. A branch line 483 leads air from said line 481 to the top of the diaphragm of the valve CR—1. A second branch 485 leading from said branch 483 feeds air to the pressure gage. The gage is a double reading one, and can therefore accommodate both of the connections made thereto.

The electric circuit SDC is shown in Fig. 3 as well as Fig. 25 and it is believed that its operation is clear.

*One man operation.*

Referring to the diagram of Fig. 3, and assuming one man operation of the coach, the following explanation of operation may be made:

(a) Assuming the vehicle is approaching a station and passengers wish to enter. (The reservoir is assumed to be filled with air at, say, ninety pounds per square inch pressure).

The driver, who is holding the steering wheel with one hand, applies the brakes by means of the brake valve AEP.

This turning of the handle of the valve AEP from the position shown in Fig. 3 applies pressure to the variable pressure lines from the main reservoir lines. Full air pressure may build up in line 423. This means that the quick service valve QS has been opened to permit reservoir air to pass from the line 413 to the line 424, through the check valve K—1, to the lines 425 and 427, whereby the brakes are set. The amount the brakes are set, of course depends upon the exact positioning of the handle of the valve AEP.

The line 431 also has a corresponding pressure rise therein. This fact causes the differential emergency valve DEV to have its diaphragm 117 depressed whereby the line 477 is cut out of communication with the line 479. By this means, if an equivalent to an emergency were happening at the wheel W to open the doors, they would not open due to this pseudo emergency, because the coach is already under full control of the driver at the valve AEP. It is only desired to have the doors open or pneumatically balance at an emergency when there actually is one and not otherwise. This means that an operator may take his hands from the wheel after a stop has been made to collect fares, make change, or the like.

As soon as high pressure reservoir air enters the line 424 the pressure also builds up in lines 481 and 483, whereby the diaphragm of the valve CR—1 is depressed. Hence high pressure air may pass from the line 407, through the valve CR—1 to the line 433. By this means the lines 435 and 437 are also put under reservoir pressure. Various valves block further passage of the air.

The pressure gage PG shows both the pressures in the main reservoir lines and in the brake lines by means of two pointers.

As soon as the diaphragm of the valve CR—1 is depressed, the circuit SDC is closed and both the stoplight LS and the dashlight DS flash.

The handle of the valve CST—3 tends to remain in any of the positions into which it is manually placed, but it should be understood that it may be manually replaced in the manner described at any time.

The coach nears a standstill. In order to make a smooth stop the driver relieves the air in the variable pressure lines by returning the valve AEP toward its normal release position (Figs. 3, 4, 5 and 6). This relieves the pressure on brakes by exhausting air from the valve AEP. He may relieve the air pressure in the variable pressure lines down to fifteen pounds per square inch, but hardly less than this as the brakes should have some pressure thereon. The driver's relieving action does not impair the relaying action of the relay valve CR—1 or the blocking action of the valve DEV because of the area ratios therein being 6:1, which is the inverse ration of 15:90, the respective pressures assumed. Any pressure above fifteen in the line 423 will keep the valve DEV and CR—1 in the positions as described.

It is assumed that in stopping the coach the accelerator was permitted to spring up (to stop the gas feed). Then if the operator desires, he may lift his heel from the heel plate 389. Hence the inverted AR—AD valve thereneath puts the line 433 into communication with the line 441. Previous to this juncture air in the main reservoir line 401 had fed air to the line 409, through the DC end of the valve DEC—1, to the *d c* side of the door engine $E^1$, hence holding the door shut. It should be remembered that the line 409 has the branch line connected therewith which passes to the inlet port 365 of the safety control valve SCV—2 in connection with the front doors 7 (see Figs. 3, 23 and 24). When the doors 7 are in the closed position, then no air can pass from the line 410 through the valve SCV—2.

Now the high pressure air in line 441 acting on the large piston in the DO side of the DEC—1 valve causes the DC side thereof to be shut off. Then air passes through the open side DO of the valve DEC—1, through line 443, check valve $K^2$ and to the door-opening side $d\ o$ of the engine E—1. The door opens while air from the side $d\ c$ of the engine E—1 goes to the exhaust of the valve DEC—1 as described.

It is to be understood that the operator may stop the gas feed to the engine of the coach completely without lifting his heel from his heel plate. Hence the car could be stopped without opening the front door merely by permitting the foot to rest in the heel plate 389. In other words, the opening of the front door by the operator is accomplished by a distinct and separate movement of his heel, and is therefore selective. The foot is usually lifted after the coach has been brought to a stop.

If the operator's foot is entirely raised, the front doors 7 are now open and passengers are free to enter and take seats. Fares may be deposited in the box BO.

When said front doors open, then the branch line 410 is automatically put into communication with the short portion of the line 471 between the valve SCV—2 and the check valve K—6 (see Figs. 3 and 24). This is because the valve SCV—2 opens. Hence air of reservoir pressure may pass through the valve SCV—2, check valve K—6, line 473, check valve K—7, line 477, through the valve DEV (if it is open), line 479, check valve K—2 and to the door opening side $d\ o$ of the door engine E—1. It also passes to the brake chambers by way of lines 447, 453, valve K—1 and lines 425 and 427. The result is that the operator cannot release the brakes when the door is open. If he tries to do so, the valve DEV permits the described passage of air for braking because the pressure in line 431 drops. A further result is that the doors are put into equilibrium with reservoir pressure at both ends of each door engine. Hence the doors are in equilibrium as if an emergency had taken place, except that they may be open. They cannot now be accidently shut on a passenger. The only way to re-start the coach is to reset the brake valve AEP to braking position whereby the valve DEV closes. Hence the doors may be closed and the brakes then released because the SCV—2 valve is closed. The doors must be closed before the brakes can be released.

(b) Now, had a passenger desired to get off, he evidently would approach the rear doors 9 after giving his signal. The treadle step is at the rear doors and the passenger would step on the treadle.

This would cause the valve AR—TP to open for passage of air. If then the driver turns on the valve CST—3, then (provided the brakes are on) air is fed from line 433 into the high pressure operating line 459, through the opened treadle pilot valve AR—TP, through line 461, check valve K—4, large pistoned end DO of the valve DEC—2 through line 451, through check valve K—3 to the door-opening side $d\ o$ of the door engine E—2, whereupon the rear doors 9 would open to release the passengers. The operation of the engine E—2 and its valve DEC—2 is similar to the explained operation of the engine E—1 and its valve DEC—1.

It will be noted that it requires both the will of the driver and the positioning of a passenger on the treadle to accomplish opening of the rear doors. Hence if no passenger wishes to alight, inadvertent throwing of the valve CST—3 will not open the doors, with a consequent unnecessary draft on passengers. However a passenger can not release himself. The driver must wilfully subscribe to the passenger's leaving by operating his valve CST—3 to door-opening position.

If the driver fails to hold the brakes set with at least fifteen pounds air pressure the relay CR—1 will fail to deliver high pressure air as described and no doors may be opened, due to the pressure of air in the door-closed end $d\ c$ of the engines E—1 and E—2.

It should be remembered that as long as the brakes are set, that breaking air is in the line 481 whereby the valve brake on the valve CST—3 is automatically set to hold the handle of said valve CST—3 in the position into which the driver sets it. Hence he may go about other operations while the handle retains its door-opening position, but the handle is always ready to come back to its door-closing position under action of its spring 40 therewith, should the brakes be released and pressure decrease in the line 481.

At the completion of the loading and unloading operation the valve AEP is returned to its original (release) position and the car is accelerated by means of the accelerator. This causes the automatic return operation to closed position of the CST—3 valve when the pressure in line 481 decreases upon release of the brakes. The lines between the door-opening side $d\ o$ of the door engine E—2 and the side DO of the valve DEC—2 are exhausted at the latter valve and the lines between the valve DEC—2 and the treadle valve AR—TP exhaust at said treadle valve.

The lines of the engine E—1 exhaust in a manner similar to those of the engine E—2 and the line 441 exhausts at the accelerator valve AR—AD.

The door engines go to closed position because of the preponderance of air pressure in the door-closing ends $d\ c$ thereof, after pressure is released in the door-opening ends $d\ o$. In other words, the differential effect of the pistons of valves DEC—1 and DEC—2 is lost when little or no pressure is had on the large pistons.

Hence we have the coach under way again.

It should be noted that the branch line 412 fed air to the line 471 when the rear doors were open because the valve SCV—1 was held open by the open door (see Fig. 23 for operation). This air passed from line 471, through check valve K—6, line 473, check valve K—7, valve DEV, lines 479, 447, check valve K—3 to the door-opening side $d\ o$ of the engine E—2. The brakes are also set from line 453. Air also passes to the door-opening side $d\ o$ of the engine E—2 by way of the check valve K—2. It is now evident that when either the front or rear door is open (or both) that it is impossible to start the coach. Furthermore, these doors cannot be closed until the AEP valve causes the brake setting, that is, when the coach is under control of the driver. Hence the greater percentage of the present day door-closing accidents are prevented.

Let it now be supposed that an emergency occurs wherein the driver is caused to lose his hold on the steering wheel while the brakes are off. The lower rim of the wheel drops and the flange 323 cooperates with the stem 369 of the safety control valve SCV. This opens the valve and hence reservoir air may pass from the line 403 to the line 475. This air reaches the door-opening side $d\ o$ of the front door engine E—1 by way of check valve K—7, line 477, valve DEV, line 479, check valve K—2 and line 455. Some of said air also reaches the door opening side $d\ o$ of the engine E—2 by way of line 477, check valve K—3 and line 449. Hence air of reservoir pressure is had in each end $d\ o$ and $d\ c$ of the engines E—1 and E—2. There is no exhausting air from the $d\ c$ sides of the engine. By this means the said door engines are put into pneumatic balance and they may be easily operated manually whereby passengers themselves may open the doors and leave the coach.

The coach is also quickly stopped because some of the air from the line 447 passes down through line 453, check valve K—1, and thence to the brakes as before described.

It is now evident that in case of accident to the driver the coach is quickly stopped and the passengers can open the doors to escape in the emergency.

Had the driver, while the coach was normally stopped and while the handle of the valve AEP was in non-braking position, left the coach, similar results would obtain. The operation of the air lines would be the same as if he would have let go of the steering wheel while the coach was in operation.

It should be remembered that although the doors are in pneumatic balance under the conditions described, that they are not necessarily open, although they can be open. Hence if the driver leaves the coach by using the driver's door 5, the passengers will not have the main door to blow a draft upon them, that is if he weights the heel plate 389 to prevent opening of the valve AR—AD.

It is not desirable that the doors be put into balance as long as the brakes are applied under control of the driver as he is then assumed to have control of the coach. Hence, whenever the driver applies the brakes by means of the brake AEP, no emergency action can take place, in so far as the diaphragm of the valve DEV is pressed down and air is prevented from passing from the line 477 to the line 479. He can then open and shut the doors 7 at will.

*Operation by driver and conductor.*

If a conductor is stationed at the valve CST—2 he may apply his operating lever and make this valve operable to pass air from the relayed high pressure line 437 to the line 469, check valve K—5, whence the air may pass to the door engine E—2 to open the door as described. This means that one more man may have control of the rear doors 9. This relieves the driver from operating the valve CST—3. When the conductor shuts his valve, the lines between the valve DEC—2 and his valve exhaust back to the conductor's valve exhaust.

The conductor's valve is located at the rear of the coach, see Figs. 1 and 2. He has no control over the front door.

*Operation by driver, conductor and street fare collector.*

If beside a conductor, there is provided a street fare collector outside of the coach, said collector may by applying his operating lever to the outside valve CST—1 (Figs. 1, 2 and 3), load the coach, say in queue fashion. This is done in conditions of congestion where it is advisable to permit passengers to enter the coach at the rear doors 9 as well as at the front doors. The street fare collector takes their fares.

The street fare collector's valve CST—1 acts like the valve CST—2 of the conductor with which it is connected in parallel. They act as stop valves.

Due to the construction of the CST valves, neither the conductor nor street fare collector can remove the valve handle without leaving the valve in door-closing position. Both parties need the valve handles, and to remove them the valves must be in their door-closing position. Hence the collector cannot permit a coach to proceed without putting his valve in door-closing position because he needs his operating handle to operate the doors of the next coach.

Advantages.

Emphasis of the following advantages will serve to clarify the operation of this coach.

(1) Doors are held shut by reservoir pressure, which is equalized automatically under certain emergency conditions, so that occupants or others may open the doors manually. Passengers cannot be trapped in a dangerous situation.

(2) Separate air is used for closing and opening the doors. This makes both actions positive.

(3) When the operator takes his hand from the steering wheel two things happen, i. e., (a) the brakes are set; (b) the air pressure on the door engines is equalized.

(4) The coach can not be started without closing the doors 7 and 9 or having them all closed.

(5) The system has an inherently low leakage factor because few pipes are under constant reservoir pressure. This is of advantage on a coach where air compressors must need be small.

(6) The door operating mechanisms are interlocked with the brake operating mechanism without putting full reservoir pressure in the brake diaphragms. This saves air which would be required to bring up the pressure after a semi-release of the brakes. It also saves the time which would be required to do this.

(7) The system employs no emergency air line but comprises emergency features.

(8) The system involves few interlocking cams or levers.

(9) Wear does not impair the operation or adjustments of the treadle mechanism.

Modified use of the valve DEV.

Fig. 26 illustrates how the DEV valve may be substituted for either valve DEC—1 or DEC—2 in conjunction with the door engines. Assuming application thereof to the rear door engine E—2 it will be noted that the pipe 421 is retained, as well as the pipe 411. The pipe 463 is also had, as well as the pipe 449. No changes need be made in the circuit.

It is evident that as long as a pressure of less than fifteen pounds or so exists in the line 463, that the high pressure in the line 411 hold the valve DEV open and pass to the door-closing side d c of the door engine E. However if the pressure in the line 463 builds up to a point above the order of fifteen pounds per square inch or so, that the diaphragm of the DEV valve will be depressed and the valve closed to passage of high pressure air. The relatively low pressure air in the pipe 463 may then operate the door engine as there is no high pressured air in its door-closing side d c. This high-pressured air exhausts from the valve DEV when said valve is closed to the passage of air therethrough as may be seen in Fig. 27. Exhaust for the other end of the engine is had through the valve governing our flow thereto.

The above construction is of quite an advantage in that there is no possibility of leakage from the high pressure lines over to the lines carrying relatively low pressure.

Modified form of emergency and safety door circuit.

It is to be understood that the valves SCV, SCV—1 and SCV—2 may have substituted therefor equivalent electric contacting switches set in parallel to operate electromagnetically functioning air releasing valves equivalent to those shown herein.

In view of the above, it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

I claim:

1. In a vehicle control pneumatic means for setting the brakes and for opening a closure, manually operable valve elements for controlling said means, the one of which controls the closure, being automatically returnable to a door closing position, and means operable from the brake setting means adapted to prevent automatic return of the closure control until the brakes are off.

2. In a vehicle control pneumatic means for setting the brakes and for opening a closure, manually operable valve elements for controlling said means, the one of which controls the closure, being automatically returnable to a door closing position, and means operable from the brake setting means adapted to prevent automatic return of the closure control until the brakes are off but which will permit manual return of said closure control at any time.

3. In a vehicle control pneumatic means for setting the brakes and for opening a closure, manually operable valve elements for controlling said means, the one of which controls the closure, being automatically returnable to a door closing position, and means operable from the brake setting means adapted to prevent automatic return of the closure control until the brakes are off but which will permit manual return of said closure control at any time, and means for automatically setting the brakes if the doors are open while the valve for manually controlling braking is set to its release position, said last named means being adapted not to effect closing of the closure.

4. In a vehicle control pneumatic means for setting the brakes and for opening a closure, manually operable valve elements for controlling said means, the one of which controls the closure, being automatically returnable to a door closing position, and means operable from the brake setting means adapted to prevent automatic return of the closure control until the brakes are off but which will permit manual return of said closure control at any time, and means for automatically setting the brakes if the closure is open and holding said closure open while the valve for manually controlling braking is set to its release position, said last named means being adapted to prevent closing of the closure until the last named valve is reset to braking position.

5. In a vehicle control pneumatic means for setting the brakes and for opening a closure, manually operable valve elements for controlling said means, the one of which controls the closure, being automatically returnable to a door closing position, and means operable from the brake setting means adapted to prevent automatic return of the closure control until the brakes are off but which will permit manual return of said closure control at any time, and means for automatically setting the brakes if the doors are open while the valve for manually controlling braking is set to its release position, said last named means being adapted not to effect closing of the closure although the closure valve is at closing position.

6. In a vehicle control pneumatic means for setting the brakes and for opening a closure, manually operable valve elements for controlling said means, the one of which controls the closure, being automatically returnable to a door closing position, and means operable from the brake setting means adapted to prevent automatic return of the closure control until the brakes are off but which will permit manual return of said closure control at any time, and means for automatically setting the brakes if the doors are open while the valve for manually controlling braking is set to its release position, said last named means being adapted not to effect closing of the closure, the said automatic brake setting means being operable only below a predetermined range of braking pressures from the manually controlled brake valve.

7. An interlocking brake and door control system comprising means for controlling the door and a control valve therefor, means for controlling the brakes from a valve, and means for holding the brakes set after the door has once been opened although the brake valve is set to release.

8. An interlocking brake and door control system comprising means for controlling the door and a control valve therefor, means for controlling the brakes from a valve, and means for holding the brakes set after the door has once been opened although the brake valve is set to release, said last named means being also adapted to hold said doors to an open position until said brake valve is again reset to braking position.

9. An interlocking brake and door control system comprising means for controlling the door and a control valve therefor, means for controlling the brakes from a valve, and means for holding the brakes set after the door has once been opened although the brake valve is set to release, said last named means being also adapted to hold said doors to an open position until said brake valve is again reset to braking position, an emergency steering wheel control adapted to cause setting of the brakes when the steering wheel is not gripped except when the brakes are already set by the above causes.

10. A vehicle control comprising in combination a closure, brakes for the vehicle, means for setting the brakes comprising a valve, means for opening the closure when the brakes are set, means for retaining setting of the brakes and the opening of the closure when said valve is returned to a non-braking position while the door-opening means is held in opening position.

11. A vehicle control comprising in combination a closure, brakes for the vehicle, means for setting the brakes comprising a valve, means for opening the closure when the brakes are set, means for retaining setting of the brakes and the opening of the closure when said valve is returned to a non-braking position while the door-opening means is held in opening position, it being impossible to restart the coach until the brake valve is set to braking position and the closure closed while the brake valve is so positioned.

12. A vehicle control comprising in combination a closure, brakes for the vehicle, means for setting the brakes comprising a valve, means for opening the closure when the brakes are set, means for retaining setting of the brakes and the opening of the closure when said valve is returned to a non-braking position while the door-opening means is held in opening position, it being impossible to restart the coach until the brake valve is set to braking position and the closure closed while the brake valve is so positioned, a steering wheel and means associated therewith for setting the brakes and equilibrating the doors when the wheel is manually released.

13. A control relay valve comprising valved means therein for controlling passage of high pressure air and re-exhaust of passed air, a diaphragm for controlling the said valved means adapted to operate with lower pressured air, and a switch cooperating with the diaphragm for closing a circuit at predetermined rises of the lower air pressures.

14. A control relay valve comprising valved means therein for controlling passage of high pressure air and re-exhaust of passed air, a diaphragm for controlling the said valved means adapted to operate with lower pressured air, and a switch cooperating with the diaphragm for closing a circuit at predetermined rises of the lower air pressures when the high pressure air is passing.

15. A control relay valve comprising valved means therein for controlling passage of high pressure air and re-exhaust of passed air, a diaphragm for controlling the said valved means adapted to operate with lower pressured air, and a switch cooperating with the diaphragm for closing a circuit at predetermined rises of the lower air pressures when the high pressure air is passing, and to open when said high pressure air is exhausting.

16. A control relay valve comprising valved means therein for controlling passage of high pressure air and re-exhaust of passed air, a diaphragm for controlling the said valved means adapted to operate with lower pressured air, and a switch cooperating with the diaphragm for closing a circuit at predetermined rises of the lower air pressures when the high pressure air is passing, and to open when said high pressure air is exhausting, the switch forming an integral part of the relay valve and being grounded therethrough.

17. An emergency valve for service of the class described comprising a chamber, a free piston therein adapted to permit or block passage of air through the valve, a second chamber communicating with the first and having a diaphragm therein, means for exhausting passed air when passage of other air is prevented, and means for controlling the operation of the piston by introduction of air on one side of the diaphragm.

18. A door control comprising in combination a door engine adapted to operate by the introduction of air into one of two ports and exhausting from the other, and a freely moving mass between the ports, a differential valve comprising a chamber connected with one of said engine ports and having a diaphragm therein, a second chamber communicating with the first and having a connection with the other port of the engine, the second chamber having a freely moving piston therein and mass therewith cooperatively abutting the diaphragm, an inlet on one side of the piston and an outlet from the said second chamber, the piston being movable under influence of inlet high pressure air or low pressure air above the diaphragm, the presence of low pressure air above the diaphragm operating the door engine from one port and preventing passage of said high pressure air, and the absence of said air permitting passage of said high pressure air to operate the engine from its other port.

19. A diaphragmed valve comprising a chamber, a free piston therein adapted to pass air to an outlet or block it permitting exhaust, and a diaphragm operable with lower pressure air adapted to control said piston.

20. A door control system comprising a chamber, a free piston therein adapted to pass air to an outlet or block it permitting exhaust, and a diaphragm operable with lower pressure air adapted to control said piston, a connection from the low pressure side of the diaphragm to inlet of a door engine, and a connection from the said outlet to the other inlet of the door engine.

21. A differential control valve comprising two chambers differentially bored and having pistons therein, inlets for the chambers, a resilient connection between the pistons positioned in a passage between said chambers, and an exhaust in said passage, outlets for the chambers each having two connections with the chambers, inlet operation of one of the pistons being adapted to set it to permit passage of inlet air to its outlet but not permit air to pass from the outlet to exhaust, the other piston being adapted to cut off inlet air from the outlet and to pass air from the outlet to the said exhaust.

22. A door engine control system including a differential control valve comprising two chambers differentially bored and having pistons therein, inlets for the chambers, a resilient connection between the pistons positioned in a passage between said chambers, and an exhaust in said passage, outlets for the chambers each having two connections with the chambers, inlet operation of one of the pistons being adapted to set it to permit passage of inlet air to its outlet but not permit air to pass from the outlet to exhaust, the other piston being adapted to cut off inlet air from the outlet and to pass air from the outlet to the said exhaust, and a door engine operable by inlet of air from one port and exhaust from another and vice versa having connections between said ports and said outlets.

23. Closure operating means for coach and the like comprising a door engine linked to open a closure, means associated with the closure adapted to prevent reclosing thereof except under predetermined conditions of brake control on the coach.

24. A foot control for coaches and the like comprising an accelerating element, a heel rest juxtapositioned thereto adapted to receive the heel of a foot which is manipulating said element, a valve below the heel rest adapted to be engaged by the heel rest when a heel is positioned therein, said engagement resulting in closing the valve to passage of air.

25. A foot control for coaches and the like comprising an accelerating element, a heel rest juxtapositioned thereto adapted to receive the heel of a foot which is manipulating said element, a valve below the heel rest adapted to be engaged by the heel rest when a heel is positioned therein, said engagement resulting in closing the valve to passage of air and disengagement resulting in opening the valve to passage of air.

26. A foot control for coaches and the like comprising an accelerating element, a foot rest juxtapositioned thereto adapted to receive the weight of a foot which is manipulating said element, a valve near the heel rest adapted to be engaged by a member operatively connected with the rest to close when a foot is positioned on the rest, and means for retracting the rest when the foot is taken therefrom whereat the valve is adapted to open.

27. A safety steering gear comprising a column, a pneumatic valve mounted thereon having an exposed element for opening and closing thereof, a steering wheel with the column, a movable wheel juxtapositioned near said steering wheel, and a flange formed with said movable wheel adapted to gravitationally engage the exposed element of the valve when said wheels are not manually gripped.

28. A control valve for manipulating vehicle closures comprising a manually movable element for bringing about movement of the closure, and a pneumatically operable brake for said element adapted to resiliently hold it under predetermined conditions of pneumatic pressure at said element brake.

29. A control valve for manipulating vehicle closures comprising a manually movable element for bringing about movement of the closure, and a pneumatically operable brake for said element adapted to resiliently hold it under predetermined conditions of pneumatic pressure at said element brake, said last named pressure being a function of the brake pressure at the vehicle brakes.

30. An interlocking brake and door control system comprising means for controlling the door and a control valve therefor, means for controlling the brakes from a valve, means for holding the brakes set after the door has once been opened although the brake valve is set to release, and means for permitting reclosing of the doors after the brake valve is reset to braking position.

31. An interlocking brake and door control system comprising means for controlling the door and a control valve therefor, means for controlling the brakes from a valve, and means for holding the brakes set after the door has once been opened although the brake valve is set to release, said last named means being also adapted to hold said doors to an open position until said brake valve is again reset to braking position, an emergency steering wheel control adapted to cause setting of the brakes when the steering wheel is not gripped except when the brakes are already set by the above causes, the emergency operation from the steering wheel being adapted to put the door into a pneumatically balanced condition in whatever the position the door happens to be in at the time of emergency operation.

32. A foot control for coaches and the like comprising an accelerating element, a heel rest juxtapositioned thereto adapted to receive the heel of a foot which is manipulating said element, a valve below the heel rest adapted to be engaged by the heel rest when a heel is positioned therein, said engagement resulting in predetermined manipulation of the valve.

33. A foot control for coaches and the like comprising an accelerating element, a heel rest juxtapositioned thereto adapted to receive the heel of a foot which is manipulating said element, a valve adapted to be moved when a heel is positioned in the rest, said movement resulting in a predetermined operation of the valve.

In testimony whereof, I have signed my name to this specification this 12th day of April, 1926.

RUFUS W. BAILEY.